United States Patent
Agiwal et al.

(10) Patent No.: US 11,758,382 B2
(45) Date of Patent: Sep. 12, 2023

(54) SYSTEM AND METHOD OF D2D DISCOVERY MESSAGE TRANSMISSION

(71) Applicant: SAMSUNG ELECTRONICS CO., LTD., Suwon-si (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/805,421

(22) Filed: Jun. 3, 2022

(65) Prior Publication Data
US 2022/0295254 A1 Sep. 15, 2022

Related U.S. Application Data

(63) Continuation of application No. 15/545,673, filed as application No. PCT/KR2016/000640 on Jan. 21, 2016, now Pat. No. 11,356,834.

(30) Foreign Application Priority Data

Jan. 21, 2015 (IN) .............................. 303/CHE/2015
Feb. 2, 2015 (IN) .............................. 510/CHE/2015
(Continued)

(51) Int. Cl.
*H04W 8/00* (2009.01)
*H04W 76/14* (2018.01)
(Continued)

(52) U.S. Cl.
CPC ........... *H04W 8/005* (2013.01); *H04W 12/08* (2013.01); *H04W 72/0453* (2013.01);
(Continued)

(58) Field of Classification Search
CPC . H04W 8/005; H04W 12/08; H04W 72/0453; H04W 76/14; H04W 72/02;
(Continued)

(56) References Cited

U.S. PATENT DOCUMENTS 9,532,224 B2 12/2016 Baek et al.
9,713,182 B2 7/2017 Baek et al.
(Continued)

FOREIGN PATENT DOCUMENTS

CN 103686676 A * 3/2014 ............ H04W 68/00
CN 103974379 A 8/2014
(Continued)

OTHER PUBLICATIONS

United States Provisional U.S. Appl. No. 62/056,042, Specification, Year 2014.
(Continued)

*Primary Examiner* — Yu-Wen Chang

(57) ABSTRACT

The present disclosure relates to a pre-5th-Generation (5G) or 5G communication system to be provided for supporting higher data rates Beyond 4th-Generation (4G) communication system such as a Long Term Evolution (LTE). The various embodiments of the present invention disclose a method and system for enabling device-to-device (D2D) discovery message transmission in a wireless communication network. The method comprises of identifying, by a D2D communication user equipment (UE), one or more carriers for transmission of one or more D2D discovery messages, determining, one or more discovery resources for transmission of one or more D2D discovery messages on the one or more identified carriers and transmitting the one or more D2D discovery messages on the one or more identified carriers.

18 Claims, 12 Drawing Sheets

(30) Foreign Application Priority Data

| Mar. 26, 2015 | (IN) | ............................ 1569/CHE/2015 |
| May 7, 2015 | (IN) | ............................ 2333/CHE/2015 |
| Jan. 20, 2016 | (IN) | .............................. 303/CHE/2015 |

(51) Int. Cl.

| *H04W 12/08* | (2021.01) |
| *H04W 72/0453* | (2023.01) |
| *H04W 72/02* | (2009.01) |
| *H04W 76/27* | (2018.01) |
| *H04W 76/40* | (2018.01) |
| *H04W 84/04* | (2009.01) |

(52) U.S. Cl.
CPC ............ *H04W 76/14* (2018.02); *H04W 72/02* (2013.01); *H04W 76/27* (2018.02); *H04W 76/40* (2018.02); *H04W 84/042* (2013.01)

(58) Field of Classification Search
CPC ... H04W 76/27; H04W 76/40; H04W 84/042; H04W 72/0473; Y04S 40/20
See application file for complete search history.

(56) References Cited

U.S. PATENT DOCUMENTS

| 2013/0183963 | A1 | 7/2013 | Turtinen et al. |
| 2014/0056220 | A1 | 2/2014 | Poitau et al. |
| 2014/0204898 | A1 | 7/2014 | Yang et al. |
| 2015/0119055 | A1 | 4/2015 | Shin et al. |
| 2015/0208332 | A1* | 7/2015 | Baghel .................. H04W 8/005 370/255 |
| 2015/0327240 | A1 | 11/2015 | Yamada et al. |
| 2016/0021483 | A1 | 1/2016 | Wei |
| 2016/0044552 | A1* | 2/2016 | Heo ...................... H04W 48/20 370/331 |
| 2016/0212608 | A1 | 7/2016 | Fukuta et al. |
| 2016/0212609 | A1 | 7/2016 | Fujishiro et al. |
| 2016/0234702 | A1 | 8/2016 | Heo et al. |
| 2016/0269885 | A1 | 9/2016 | Kim et al. |
| 2016/0270136 | A1 | 9/2016 | Liu et al. |
| 2016/0295430 | A1 | 10/2016 | Jung et al. |
| 2016/0323868 | A1 | 11/2016 | Kalhan et al. |
| 2016/0338019 | A1 | 11/2016 | Ratasuk et al. |
| 2016/0366677 | A1 | 12/2016 | Fujishiro et al. |
| 2017/0064534 | A1 | 3/2017 | Loehr et al. |
| 2017/0064734 | A1 | 3/2017 | Tsuboi et al. |
| 2017/0223669 | A1 | 8/2017 | Ma et al. |
| 2017/0230815 | A1 | 8/2017 | Yasukawa et al. |
| 2017/0245233 | A1 | 8/2017 | Jung et al. |
| 2017/0332434 | A1 | 11/2017 | Lee et al. |
| 2017/0339679 | A1 | 11/2017 | Lee et al. |
| 2018/0041885 | A1 | 2/2018 | Li et al. |
| 2018/0199181 | A1 | 7/2018 | Jung et al. |

FOREIGN PATENT DOCUMENTS

| KR | 10-2014-0058366 A | 5/2014 |
| KR | 10-2014-0096955 A | 8/2014 |
| WO | 2013172755 A1 | 11/2013 |
| WO | 2014/031829 A2 | 2/2014 |
| WO | 2014/114263 A1 | 7/2014 |

OTHER PUBLICATIONS

United States Provisional U.S. Appl. No. 62/034,780, Specification, Year 2014.
LG Electronics, "Power Control for D2D Transmission," 3GPP TSG RAN WG1 Meeting #78bis, R1-144024, Oct. 2014.
Samsung, "Signaling flows for Type 2B Resource Allocation", 3GPP TSG RAN WG2 Meeting #85bis, Mar. 31-Apr. 1, 2014, R2-141388, 6 pages.
Fujitsu, "Some issues for the discovery resource allocation", 3GPP TSG-RAN WG2 #86, May 19-23, 2014, R2-142264, 3 pages.
Office Action dated Mar. 10, 2021 in connection with Chinese Patent Application No. 201680006788.4, 13 pages.
European Patent Office, "Communication pursuant to Article 94(3) EPC," Application No. EP16740409.4, Mar. 28, 2019, 22 pages.
Kyocera, "Inter-frequency and inter-PLMN D2D discovery," R2-144534, 3GPP TSG-RAN WG2 #87bis, Shanghai, China, Oct. 6-10, 2014, 9 pages.
LG Electronics Inc., "Creation of gap for discovery reception," R2-145080, 3GPP TSG-RAN WG2 #88, San Francisco, USA, Nov. 17-21, 2014, 3 pages.
Extended European Search Report regarding Application No. 16740409.4, dated Jul. 11, 2018, 14 pages.
Etri, "Consideration on Inter-PLMN discovery", 3GPP TSG-RAN3 Meeting #85bis, R3-142398, Oct. 2014, 3 pages.
ZTE, "Inter-frequency and inter-PLMN discovery relevant signalling", 3GPP TSG-RAN2#87bis, R2-144484, Oct. 2014, 3 pages.
Kyocera, "Handling of multi-carrier ProSe operations", 3GPP TSG-RAN WG2 #88, R2-144969, Nov. 2014, 5 pages.
Ericsson, "Inter-Carrier Aspects of D2D Discovery and Communication", 3GPP TSG RAN WG1 Meeting #78bis, R1-144320, 6 pages.
Qualcomm Incorporated, Signaling Details for ProSe Direct Discovery, 3GPP TSG-RAN WG2 #87Bis, R2-144548, Oct. 2014, 9 pages.
Sony, "Inter-frequency and inter-PLMN discovery resource", 3GPP TSG-RAN WG2 Meeting #87bis, Oct. 6-10, 2014, 3 pages, R2-144400.
ZTE, "Inter-cell discovery relevant signalling", 3GPP TSG-RAN WG2 Meeting #87, Aug. 19-22, 2014, 4 pages, R2-143604.
Samsung, "Discovery monitoring in RRC connected", 3GPP TSG RAN WG1 Meeting #79, Nov. 17-21, 2014, 2 pages, R1-144871.
Fujitsu, "Considerations on Resource Allocation for ProSe Discovery", 3GPP TSG-RAN WG2 #87bis, Oct. 6-10, 2014, R2-144289.
Qualcomm Inc., "Remaining details of D2D discovery", 3GPP TSG-RAN WG1 #79, Nov. 17-21, 2014, R1-145069.
International Search Report dated May 3, 2016 in connection with International Patent Application No. PCT/KR2016/000640.
Written Opinion of the International Searching Authority dated May 3, 2016 in connection with International Patent Application No. PCT/KR2016/000640.
Notice of Allowance dated Jul. 28, 2022 in connection with Korean Patent Application No. 10-2017-7023236, 8 pages.

* cited by examiner

SYSTEM AND METHOD OF D2D DISCOVERY MESSAGE TRANSMISSION

CROSS-REFERENCE TO RELATED APPLICATIONS

This application is a continuation of application Ser. No. 15/545,673, now U.S. Pat. No. 11,356,834 issued Jun. 7, 2022, which is a National Phase Entry of PCT International Application No. PCT/KR2016/000640, filed on Jan. 21, 2016, which claims priority to Indian Patent Application Nos. 303/CHE/2015, filed Jan. 21, 2015; 510/CHE/2015, filed Feb. 2, 2015; 1569/CHE/2015, filed Mar. 26, 2015; 2333/CHE/2015, filed May 7, 2015; and 303/CHE/2015, filed Jan. 20, 2016, the contents of which are incorporated herein by reference.

BACKGROUND

1. Field

The present disclosure generally relates to wireless communication systems and particularly relates to an apparatus and method for enabling device to device (D2D) discovery message transmission in a wireless communication network.

2. Description of Related Art

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

device to device (D2D) discovery is being studied in communication standard groups to enable discovery services between the UEs. D2D Discovery is a process which determines that a D2D-enabled user equipment (UE) is in proximity of another D2D-enabled UE. A discovering D2D-enabled UE determines whether or not another D2D-enabled UE is of interest to it using D2D Discovery. The D2D-enabled UE is of interest to a discovering D2D-enabled UE if its proximity needs to be known by one or more authorized applications on the discovering D2D-enabled UE. For example, a social networking application can be enabled to use D2D discovery feature. The D2D discovery enables the D2D-enabled UE of a given user of a social networking application to discover and be discoverable by the D2D-enabled UEs of his/her friends. In another example, the D2D discovery can enable the D2D-enabled UE of a given user of a search application to discover stores/restaurants etc. of its interest in its proximity. The D2D-enabled UE discovers other D2D-enabled UEs in its proximity by using direct UE-to-UE signaling.

The D2D UE which is in coverage of network can be in radio resource control (RRC) Idle state or RRC connected state. In RRC idle state, the D2D UE is camped on a cell i.e. D2D UE has completed the cell selection/reselection process and has chosen a cell. The D2D UE in RRC idle state monitors system information broadcasted in the camped cell and (in most cases) paging information. The D2D UE in RRC idle state receives the system information and paging information on the carrier frequency (i.e. center frequency of the camped cell). In RRC idle state, the camped cell is also referred as serving cell and carrier frequency of the camped cell is also referred as camped/serving carrier or camped/serving frequency. In RRC connected state, the UE can have one or more serving cells. One of serving cell is designated as primary serving cell and others (if any) are secondary serving cells. The primary serving cell is the cell, in which the D2D UE either performs the initial connection establishment procedure or initiates the connection re-establishment procedure. The secondary serving cell is the cell, which may be configured once an RRC connection is established and which may be used to provide additional radio resources for wireless link between D2D UE and base station (B S) or enhanced node B (eNB). Carrier frequency of the primary serving cell and the secondary serving cell is referred as primary carrier/frequency and secondary carrier/frequency respectively.

In existing wireless devices, for D2D Discovery, a D2D UE which is in coverage of network transmits discovery message using the radio resources configured by the network. In RRC idle state, serving/camped cell broadcasts the radio resources for discovery (also referred as discovery resources) in system information block (SIB) 19. The discovery resources broadcasted in SIB 19 corresponds to serving/camped cell. The D2D UE in RRC idle state can use the discovery resources signaled in SIB 19 received on serving/camped carrier/frequency, to transmit discovery messages on serving/camped carrier/frequency. In RRC connected state, the D2D UE interested in transmitting discovery message sends discovery resource request to primary serving cell on primary serving carrier/frequency. Base station (BS) or eNB provides discovery resources (contention based resource pool(s) or dedicated resource(s)) to D2D UE in discovery resource response for discovery message transmission. The discovery resources received in discovery resource response corresponds to primary serving cell. The D2D UE in RRC connected state can use the discovery resources received in discovery resource response to transmit discovery messages on primary serving carrier/frequency.

In the existing art, a D2D UE interested in transmitting the discovery message receives the system information block (SIB) 19 broadcasted in the serving cell (i.e. camped cell in RRC idle state and primary serving cell in RRC connected state). If SIB19 is not broadcasted in the camped/serving cell or primary serving cell, then the D2D UE does not transmit discovery message.

In the existing art, a D2D UE interested in transmitting the discovery message is allowed to transmit discovery message only on camped/serving carrier/frequency of camped/serving cell in RRC idle state and on primary serving carrier/frequency of primary serving cell in RRC connected state. If the UE's camped/serving cell or primary serving cell does no support D2D discovery, then the D2D UE interested in transmitting the discovery message cannot transmit discovery message(s). In order to resolve this, the D2D UE may prioritize a carrier/frequency supporting D2D discovery for cell (re)selection so that D2D UE is always camped on a cell supporting D2D discovery. The limitation of this approach is that the frequency/carrier supporting D2D discovery will get overloaded even for cellular (i.e. communication with BS or eNB) communication.

In view of the foregoing, there is a need for an enhanced system and method for enabling D2D discovery message transmission.

The above mentioned shortcomings, disadvantages and problems are addressed herein and which will be understood by reading and studying the following specification.

SUMMARY

Embodiments of the present disclosure are to address at least the above-mentioned problems and/or disadvantages and to provide at least the advantages described below.

The various embodiments of the present disclosure disclose a method for enabling device-to-device (D2D) discovery message transmission in a wireless communication network. The method comprises of identifying, by a communication user equipment (UE), one or more carriers for transmission of one or more D2D discovery messages, determining, one or more discovery resources for transmission of one or more D2D discovery messages on the one or more identified carriers and transmitting the one or more D2D discovery messages on the one or more identified carriers.

According to an embodiment of the present disclosure, identifying one or more carriers for transmission of the D2D discovery message comprises of selecting one or more carriers which are pre-configured in the D2D UE or provided by the network wherein a carrier is selected if a suitable cell is found in the carrier.

According to an embodiment of the present disclosure, identifying one or more carriers for transmission of the D2D discovery message comprises of one or more public land mobile networks (PLMNs) on which D2D UE is authorized to perform discovery transmission, is preconfigured in D2D UE or is provided by the network and determining, by the D2D UE, the carrier for the D2D discovery message transmission by searching a suitable cell supporting discovery corresponding to the authorized PLMN on the carriers on which the D2D UE supports discovery.

According to an embodiment of the present disclosure, identifying one or more carriers for transmission of the D2D discovery message comprises of one or more PLMNs on which D2D UE is authorized to perform discovery transmission, is preconfigured in D2D UE or is provided by the network, receiving, by the D2D UE a list of carrier for discovery message transmission and PLMN identifier broadcasted by the serving cell and determining, by the D2D UE, the one or more carriers for the D2D discovery message transmission corresponding to authorized PLMNs from received list of carrier and PLMN identifier.

According to an embodiment of the present disclosure, determining the discovery resources for transmission of the one or more D2D discovery message on the identified one or more carriers comprises of determining whether the carrier for discovery message transmission is same as primary carrier or not, receiving, by the D2D UE a system information broadcasted on a carrier on which the D2D wants to transmit the D2D discovery message while camping on the primary carrier if the carrier is not same as the primary carrier, receiving, by the D2D UE a system information broadcasted on the primary carrier on which the D2D wants to transmit the D2D discovery message if the carrier is same as the primary carrier and using by the D2D UE the discovery resources from a discovery transmission resource pool in the received system information for transmission of the D2D discovery message.

In another embodiment of the present disclosure, determining the discovery resources for transmission of the one or more D2D discovery messages on the identified one or more carriers further comprises of broadcasting, by a serving cell, a discovery configuration for one or more carriers in a system information, receiving, by the D2D UE, the system information broadcasted in the serving cell and using the discovery resources from the discovery transmission resource pools in the received system information corresponding to the carrier for transmission of the discovery message. The system information broadcasted by the serving cell comprises of a carrier frequency, a PLMN identifier (ID) and a cell ID associated with the discovery resources for the discovery message transmission.

According to an embodiment of the present disclosure, determining the discovery resources for transmission of the one or more D2D discovery messages on the identified one or more carriers further comprises of sending, by the D2D UE, a discovery transmission resource request in a radio resource control (RRC) signaling message to a serving cell in an RRC connected state and providing by the serving cell one or more discovery resources for transmission of the D2D discovery message on one or more carriers in an RRC signaling. Here the discovery transmission resource request indicates a number of discovery messages for which the D2D UE requests the network to assign dedicated discovery resources on a carrier and the carrier on which UE wants to transmit the D2D discovery messages.

According to an embodiment of the present disclosure, the one or more carriers for which the serving cell provides resources for transmission of the D2D discovery message belongs to a same public land mobile network (PLMN) or a different PLMN than the PLMN of a serving cell in which the UE is camped.

According to an embodiment of the present disclosure, the discovery transmission resource request for requesting discovery resources for discovery message transmission on a carrier is sent to the serving cell only if the carrier for discovery message transmission is included in a list of carriers transmitted by the serving cell in the system information, where the list of frequencies indicate the frequencies on which the discovery transmission is allowed.

According to an embodiment of the present disclosure, the D2D UE selects the discovery resource configuration if discovery resource configuration of multiple carriers are provided by the serving cell in the RRC signaling based on a frequency on which the non-serving cell is detected, a frequency on which the non-serving cell detected is strongest and an interested frequency and/or PLMN.

According to an embodiment of the present disclosure, the serving cell indicates one of the discovery resources for a carrier, an intimation for the D2D to obtain the discovery resource configuration by reading a SIB 19 autonomously on the carrier and intimation for the D2D UE to send a discovery resource request to the serving cell for obtaining discovery resources on the carrier.

According to an embodiment of the present disclosure, transmitting the D2D discovery message on the one or more identified carriers comprises at least one of transmitting, by the D2D UE, the D2D discovery message on the carrier using the downlink reference timing of the primary serving cell, transmitting, by the D2D UE, the D2D discovery message on the carrier using the downlink reference timing of a secondary serving cell and transmitting, by the D2D UE, the D2D discovery message on the carrier using the downlink reference timing of the carrier paired with the carrier for the discovery message transmission.

According to an embodiment of the present disclosure, transmitting by the D2D discovery message on the one or more identified carriers further comprises one of transmitting, by the D2D UE, the discovery message transmission on a carrier using the downlink reference timing of the secondary serving cell if the carrier/frequency for discovery transmission is same as that of the secondary serving cell, or transmitting, by the D2D UE, the discovery message transmission on the carrier using the downlink reference timing of the primary serving cell if the carrier/frequency for discovery transmission is same as that of the primary serving cell or transmitting, by the D2D UE, the discovery message transmission on a carrier using the downlink reference timing of the primary serving cell or the secondary serving cell as indicated by the serving cell in the RRC signaling or transmitting, by the D2D UE, the discovery message transmission on a carrier using the downlink reference timing of the downlink (DL) frequency paired with the carrier used for discovery message transmission;

According to an embodiment of the present disclosure, transmitting the D2D discovery message on the one or more identified carriers further comprises of searching, by the D2D UE for a D2D synchronization signal (D2DSS) on a carrier for discovery message transmission near a discovery sub frame indicated in the discovery resource configuration and using the timing based on the D2DSS to transmit on the carrier for discovery message transmission.

According to an embodiment of the present disclosure, transmitting the D2D discovery message on the one or more identified carriers further comprises of indicating, by the serving cell, a timing offset in the discovery resource configuration and transmitting, by the UE, the D2D discovery message at an aggregated time of downlink time and timing offset. The timing offset indicates the offset between the sub frame of the serving carrier and the non-serving carrier and the timing offset is included if the serving carrier and the carrier of the discovery message transmission is not synchronized.

According to an embodiment of the present disclosure, the D2D UE performs concurrent transmission in the serving carrier and the discovery message transmission in other carrier when the discovery sub-frame on F2 overlaps with the sub-frames for uplink transmission in the serving carrier. The D2D UE performs concurrent transmission if sum of a transmit power for the discovery message transmission in other carrier and transmit power for transmission on the serving carrier during the overlapping period is less than a maximum transmission power.

According to an embodiment of the present disclosure, the D2D prioritizes allocation of power for transmission on the serving carrier. The D2D UE first allocates power for uplink transmission on the serving carrier and then limit the transmit power for the discovery message transmission on other carrier to remaining power available after allocating power for the uplink transmission.

According to an embodiment of the present disclosure, the D2D adjusts the discovery message transmission power such that the total power does not exceed the maximum power during the time when the discovery message transmission on other carrier and the uplink transmission on the serving carrier overlaps.

The foregoing has outlined, in general, the various aspects of the disclosure and is to serve as an aid to better understanding the more complete detailed description which is to follow. In reference to such, there is to be a clear understanding that the present disclosure is not limited to the method or application of use described and illustrated herein. It is intended that any other advantages and objects of the present disclosure that become apparent or obvious from the detailed description or illustrations contained herein are within the scope of the present disclosure.

BRIEF DESCRIPTION OF THE DRAWINGS

The above and other objects, features and advantages of certain exemplary embodiments of the present disclosure will be more apparent from the following taken in conjunction with the accompanying drawings, in which.

Throughout the drawings, it should be noted that like reference numbers are used to depict the same or similar elements, features, and structures.

DETAILED DESCRIPTION

Figure 1:
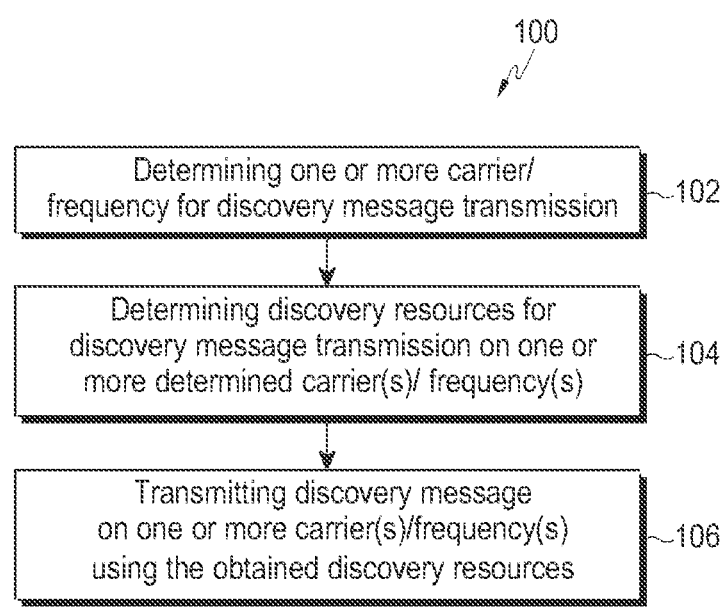
FIG. 1 is a schematic flow diagram illustrating a method of D2D discovery message transmission, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It is to be noted that term 'carrier', 'frequency' and 'carrier frequency' are used interchangeably in the description, and the person having ordinarily skilled in the art can understand that the any of the word can be used to describe the embodiment, without departing from the scope of the disclosure.

A method and apparatus proposed in various embodiments of the present disclosure may be applied to various communication systems such as an institute of electrical and electronics engineers (IEEE) 802.16ac communication system, an IEEE 802.16 communication system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, an internet protocol television (IPTV) service, and the like, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSDPA) mobile communication system, a high rate packet data (HRPD) mobile communication system proposed in a 3rd generation partnership project 2 (3GPP2), a wideband code division multiple access (WCDMA) mobile communication system proposed in the 3GPP2, a code division multiple access (CDMA) mobile communication system proposed in the 3GPP2, a mobile internet protocol (Mobile IP) system, and/or the like.

The present disclosure discloses a system and method of device to device (D2D) discovery message transmission. According to the present system and method, a D2D user equipment (UE), if authorized by the network, can transmit discovery message on carrier(s)/frequency(s) other than the carrier/frequency of serving cell (i.e. camped cell in radio resource control (RRC) idle state and primary serving cell or PCell in RRC connected state), in same PLMN as serving cell or different PLMN. If the D2D UE is interested in transmitting discovery message on one or more carrier/frequency, wherein the carrier/frequency for discovery message transmission is different from the carrier/frequency of the camped/serving cell in RRC idle state or different from the carrier/frequency of primary serving cell (or PCell) in RRC connected state, then the D2D UE can transmit discovery message on carrier/frequency for discovery message transmission if authorized by the network. For example, if the D2D UE is interested in transmitting discovery message on carrier/frequency F1 and carrier/frequency of the camped/serving cell in RRC idle state is F2 or carrier/frequency of primary serving cell (or PCell) in RRC connected state is F2, then the D2D UE can transmit discovery message on carrier/frequency F1 without changing its serving cell. The carrier/frequency for discovery message transmission can belong to same or different PLMN than the PLMN of camped/serving cell or primary serving cell (or PCell).

FIG. 1 is a schematic flow diagram 100 illustrating a method of D2D discovery message transmission, according to an embodiment of the present disclosure. According to the present disclosure, at step 102, a D2D UE determines one or more carrier/frequency for discovery message transmission. In an embodiment of the present disclosure, one or more carrier/frequency on which D2D UE is authorised for discovery message transmission can be pre-configured in the D2D UE or may be provided by the network (e.g. by D2D function/server in network).

In another embodiment of the present disclosure, one or more PLMNs on which the D2D UE is authorized to perform discovery transmission can be preconfigured in the D2D UE or may be provided by the network (e.g. by D2D function/server in network). The D2D UE can transmit on one or more carrier/frequency supporting discovery of these PLMNs. The serving cell (i.e. camped cell in RRC idle state or primary serving cell (PCell) in RRC connected state) can provide in system information, such as, but not limited to, in system information block (SIB19), and the like a list of carrier/frequency along with PLMN ID on which the UE is allowed to transmit discovery message. The D2D UE can obtain the list of carrier/frequency for discovery message transmission corresponding to authorized PLMNs from the carrier/frequency list received in system information. In another embodiment of the present disclosure, serving cell can send a list of frequencies. Discovery transmission is allowed on a frequency listed in frequency list if a field DiscTXresources is included for that frequency and is not set to 'No TX on carrier'. Discovery reception is only allowed on a frequency listed in frequency list if a field DiscTXresources is included for that frequency and is set to 'No TX on carrier'. In another embodiment of the present disclosure, serving cell can send a list of frequencies and discovery transmission is allowed on each frequency listed in frequency list and separate indication is not needed.

In another embodiment of the present disclosure, one or more PLMNs on which the D2D UE is authorized to perform discovery transmission can be preconfigured in the D2D UE or may be provided by the network (e.g. by D2D function/server in network). The D2D UE can transmit on one or more carrier/frequency supporting discovery of these PLMNs. The D2D UE can determine the frequency (s) for discovery message transmission by searching suitable cell (a cell is suitable if it received signal level in cell is above a threshold or it meets S criteria) corresponding to authorized PLMN on frequency(s) on which the D2D UE supports discovery.

S_criteria (as defined in prior art TS 36.304):
Srxlev>0 and Squal>0, where, $$Srxlev = Qrxlevmeas - (Qrxlevmin + Qrxleminoffset) - Pcompensation$$

$$Squal = Qqualmeas - (Qqualmin + Qqualminoffset)$$

Further, at step 104, the method comprises the D2D UE then determines the discovery resources for discovery message transmission on determined one or more carrier frequencies. If the carrier/frequency for discovery message transmission is same as the camped/serving carrier (i.e. carrier of camped/serving cell in RRC idle state) or same as primary carrier (i.e. carrier of primary serving cell in RRC connected state), then the discovery resources for discovery message transmission can be obtained as described in existing art. If the carrier frequency for discovery message transmission is not same as the camped/serving carrier (i.e. carrier of camped/serving cell in RRC idle state) or not same as primary carrier (i.e. carrier of primary serving cell in RRC connected state), then in one embodiment the D2D UE autonomously receives the system information (e.g. in SIB 19) broadcasted on carrier/frequency on which the D2D UE wants to transmit discovery message. The D2D UE can use additional receiver to obtain this information or it can do so during idle periods in camped/serving or primary frequency. The D2D UE can use discovery resources from the discovery transmission resource pools in the received system information (e.g. in SIB 19) for discovery message transmission. If the D2D UE autonomously receives system information (e.g. in SIB 19) of the other carrier/frequency of same or different PLMN to acquire discovery resources for discovery message transmission and that carrier/frequency does not provide discovery resources for discovery message transmission in system information (e.g. in SIB 19), then the D2D UE does not perform discovery message transmission on that carrier/frequency.

In another embodiment of the present disclosure, a serving cell broadcasts the discovery configuration for one or more frequencies in system information (i.e. SIB 19). The D2D UE can receive the system information (e.g. SIB 19) broadcasted in serving cell (i.e. camped cell in RRC idle state and primary serving cell or PCell in RRC connected state) and can use discovery resources from the discovery transmission resource pools in the received system information corresponding to carrier/frequency for discovery message transmission. Carrier frequency, PLMN ID and cell ID associated with discovery resources for discovery message transmission can be included in system information broadcasted by serving cell. In another embodiment of the present disclosure, if the serving cell does not provide discovery resource configuration for an carrier it can indicate in RRC signaling whether D2D UE should obtain the discovery resource configuration by reading the SIB 19 autonomously on that carrier or should send discovery resource request to serving cell for requesting resources on that carrier.

In another embodiment of the present disclosure, the D2D UE can send discovery transmission resource request in RRC signaling message to the serving cell (i.e. primary serving cell or Pcell). In an embodiment of the present disclosure, the RRC signaling message can be, but not limited to, D2DUEInformation message, and the like, and the person having ordinarily skilled in the art can understand that any of the known RRC signaling message can be used to transmit discovery transmission resource request, without departing from the scope of the disclosure. It is to be noted that RRC signaling message can be sent in RRC connected state. For each carrier/frequency on which the D2D UE wants to transmit discovery message, the D2D UE indicates number of discovery messages for which it requests network to assign dedicated discovery resources in the discovery transmission resource request. It also indicates the carrier/frequency on which the D2D UE wants to transmit the discovery messages, if different from primary carrier/frequency. The D2D UE can also include the cell ID and/or PLMN ID in discovery transmission resource request. The Serving cell can provide discovery resources (contention based discovery resource pool(s) and/or dedicated discovery resources) for discovery message transmission on one or more carrier/frequency and indicates in dedicated RRC signaling (e.g. RRC Connection Reconfiguration message).

It is to be noted that carrier/frequency for which serving cell provides resources can belong to same PLMN as serving cell or different PLMN. The carrier/frequency for which serving cell provides resources can belong to same eNB as serving cell or different eNB. If carrier/frequency for which serving cell provides resources belongs to different eNB of same PLMN or different PLMN, then serving cell may obtain resources over X2 interface between eNBs. Alternately, network (e.g. eNB) can configure some UE(s) to read the discovery configuration on one or more frequencies and report the same.

In another embodiment of the present disclosure, the discovery transmission resource request for requesting discovery resources for discovery message transmission on a carrier/frequency can be sent to serving cell, only if carrier/frequency for discovery message transmission is included in list of frequencies transmitted by serving cell in system information, wherein the list of frequencies indicate the frequencies on which discovery transmission is allowed. In another embodiment of the present disclosure, the serving cell can send a list of frequencies. Discovery transmission can be allowed on a frequency listed in frequency list if a field DiscTXresources is included for that frequency and is not set to 'No TX on carrier'. Discovery reception is only allowed on a frequency listed in the frequency list if a field DiscTXresources is included for that frequency and is set to 'No TX on carrier'. In another embodiment of the present disclosure, the serving cell can send a list of frequencies and discovery transmission is allowed on frequency listed in frequency list and separate indication is not needed.

If discovery resource configurations of multiple carrier/frequencies are provided by serving cell in RRC signaling (dedicated or broadcast), then in one embodiment of the present disclosure, the D2D UE can select discovery resource configuration as follows:

The D2D UE can select resource configuration corresponding to any frequency on which cell is detected The D2D UE can select resource configuration corresponding to frequency on which cell detected is strongest The D2D UE can select resource configuration corresponding to its interested frequency and/or PLMN.

Further, at step 106, the method comprises step of transmit discovery message on one or more carrier/frequency using the obtained discovery resources. If the carrier/frequency for discovery message transmission is not same as the camped/serving carrier/frequency (i.e. carrier/frequency of camped/serving cell in RRC idle state) or not same as primary carrier/frequency (i.e. carrier/frequency of primary serving cell in RRC connected state), then the D2D UE determines the reference timing for discovery message transmission. The D2D UE has reference timing for each of the serving cell(s). The carrier/frequency for discovery message transmission may or may not be time synchronized with carrier/frequency of serving cell. So D2D UE at step 106 determines whether it should transmit discovery message using timing of one of serving cell (s) or should it transmit discovery message using timing of carrier frequency on which it is transmitting discovery message in case of TDD system or timing of carrier frequency paired with carrier frequency on which it is transmitting discovery message in case of FDD system.

Although FIG. 1 illustrates a method of D2D discovery message transmission, according to an embodiment of the present disclosure, various changes could be made to FIG. 1. For example, although shown as a series of operations, various operations in FIG. 1 could overlap, occur in parallel, occur in a different order, or occur multiple times.

Figure 2:
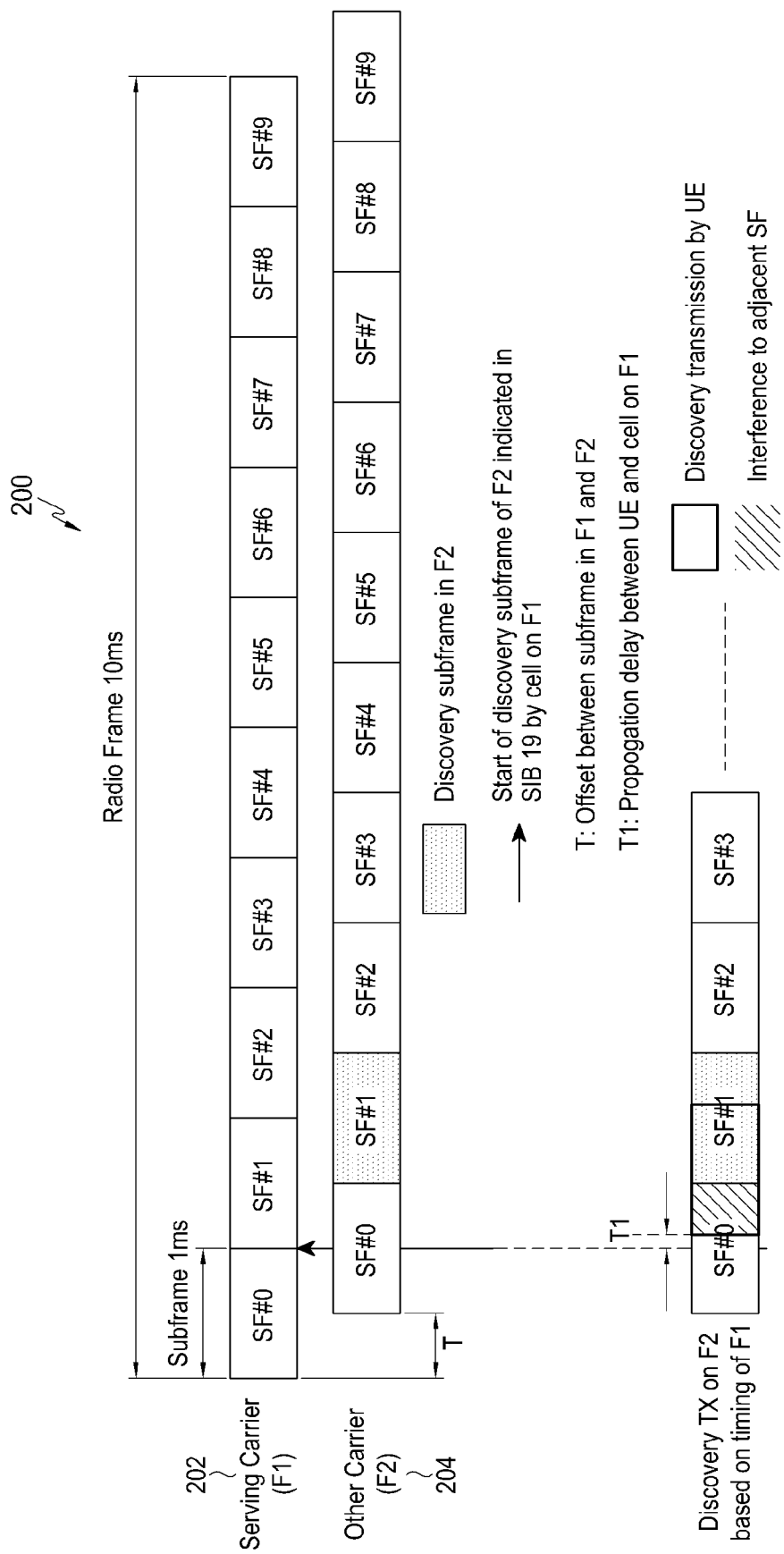
FIG. 2 is a schematic diagram illustrating occurrence of interference during transmission of discovery message on the carriers, according to an embodiment of the present disclosure.

FIG. 2 is a schematic diagram 200 illustrating occurrence of interference during transmission of discovery message on the carriers/frequencies, according to an embodiment of the present disclosure. According to the FIG. 2, the schematic diagram 200 comprises of two carriers/frequencies, serving carrier F1 202 and the other carrier F2 204. The carrier/frequency for discovery message transmission may or may not be time synchronized with carrier/frequency of serving cell. If the D2D UE transmits discovery message on other carrier/frequency F2 using the timing of serving cell on carrier/frequency F1, then it may lead to interference as illustrated in. Discovery resources are indicated on F2 by serving cell.

The D2D UE at step 106 determines whether it should transmit discovery message using timing of one of serving cell(s) or should it transmit discovery message using timing of carrier frequency on which it is transmitting discovery message in case of time-division duplexing (TDD) system or timing of carrier frequency paired with carrier frequency on which it is transmitting discovery message in case of FDD system. In an embodiment of the present disclosure, the D2D UE can transmit the discovery message transmission on a carrier/frequency using the downlink reference timing of primary serving cell. In another embodiment of the present disclosure, the D2D UE can transmit the discovery message transmission on a carrier/frequency using the downlink reference timing of secondary serving cell.

In another embodiment of the present disclosure, the D2D UE can transmit the discovery message transmission on a carrier/frequency using the downlink reference timing of carrier/frequency paired with carrier/frequency for discovery message transmission. In this case, the D2D UE can acquire the timing for transmission by searching the cell on carrier/frequency paired with carrier/frequency for discovery message transmission. The downlink timing of found cell is used for discovery message transmission.

In another embodiment of the present disclosure, the D2D UE can transmit the discovery message transmission on a carrier/frequency using the downlink reference timing of secondary serving cell if the carrier/frequency for discovery transmission is same as that of secondary serving cell; else the D2D UE transmits discovery message transmission on a carrier/frequency using the downlink reference timing of primary serving cell if the carrier/frequency for discovery transmission is same as that of primary serving cell; else the D2D UE transmits discovery message transmission on a carrier/frequency using the downlink reference timing of primary serving cell or secondary serving cell as indicated by serving cell (i.e. camped cell in RRC idle state, primary serving cell or PCell in RRC connected state) in RRC signaling; else the D2D UE transmits discovery message transmission on a carrier/frequency using the downlink reference timing of DL frequency paired with carrier/frequency used for discovery message transmission. The serving cell can indicate in RRC signaling whether the D2D UE can use any of the herein abovementioned options for determining the transmission timing. Indication from network can be useful as synchronization of transmission timing across frequencies is related to network deployment and hence known to network.

In another embodiment of the present disclosure, the D2D UE can search for D2D synchronization signal (SS) on the carrier/frequency for discovery message transmission near the discovery sub frame (sub-frame where discovery is transmitted is indicated in discovery resource configuration) and uses the timing based on D2D SS to transmit on carrier/frequency for discovery message transmission. The network can configure one or more UEs to transmit discovery D2D SS even if they do not transmit discovery message.

In another embodiment of the present disclosure, the serving cell can indicate the Timing Offset 'T' in discovery resource configuration. The D2D UE can transmit at DL timing+T, wherein the DL timing is the DL timing of serving cell. In an embodiment of the present disclosure, the timing offset is included if serving carrier/frequency and carrier/frequency of discovery message transmission is not synchronized. In another embodiment of the present disclosure, the timing offset can indicate the offset between sub-frame of serving and non-serving carrier.

The embodiments herein can also handle concurrent transmission in serving carrier (e.g. F 1) and discovery message transmission on other carrier (e.g. F2). According to the present embodiment, the discovery message transmission on other carrier/frequency F2 may require the D2D UE to perform concurrent transmission, such as, but not limited to, uplink (UL) transmission, discovery transmission, and the like in serving carrier/frequency F 1 and the discovery message transmission in other carrier/frequency F2. The UL transmission refers to transmission from UE to eNB.

The operation of the D2D UE which does not have additional TX chain for discovery message transmission on carrier/frequency F2 is as follows:

Option 1: the D2D UE prioritizes between transmission in serving carrier and discovery message transmission on other carrier. In another embodiment of the present disclosure, transmission in serving carrier can be prioritized over discovery message transmission on the other carrier. In an alternate embodiment of the present disclosure, the discovery message transmission on other carrier can be prioritized over transmission in the serving carrier. In yet another alternate embodiment of the present disclosure, if the D2D UE supports both PS and non-PS discovery, and transmission on serving carrier is because of non-PS discovery, then the D2D UE can prioritize transmission in other carrier.

Option 2: D2D UE sends discovery message transmission interest indication including carrier/frequency for discovery message transmission to eNB. In an embodiment of the present disclosure, the eNB can provide gaps (i.e. not schedule UL transmission) on serving carrier corresponding to discovery sub-frames on other carrier/frequency. The eNB can provide gaps if the D2D UE does not have additional transmit chain for discovery message transmission. The eNB can be aware of where the gaps are needed if it knows discovery resource configuration in non-serving cell's frequency. In another embodiment of the present disclosure, the information about discovery resource configuration or discovery sub-frames in other frequency can be provided by D2D UE.

Option 3: The D2D UE performs option 1 in RRC idle state and option 2 in RRC connected state.

The operation of D2D UE which have additional TX chain for discovery message transmission on carrier/frequency F2 is as follows:

The D2D UE can perform concurrent transmission in serving carrier/frequency F1 and discovery message transmission in other carrier/frequency F2 when the discovery sub-frame on F2 overlaps with sub-frame(s) for uplink transmission in serving carrier/frequency F 1. However, if sum of transmit power for discovery message transmission in other carrier and transmit power for transmission on serving carrier during the overlapping period is greater than maximum transmission power then, the D2D UE cannot concurrently transmit in serving carrier/frequency and discovery message transmission in other carrier/frequency.

In an embodiment of the present disclosure, the D2D UE can prioritize allocation of power for transmission on serving carrier/frequency. If the D2D UE's discovery transmission does not occur on the serving cell with its uplink transmission(s), and if the D2D UE's discovery transmission in a sub-frame overlaps in time with its uplink transmission(s), the D2D UE can adjust the discovery message transmission power such that its total power does not exceed the maximum power during the time when discovery message transmission on other carrier/frequency and uplink transmission on serving cell on carrier/frequency overlaps. The D2D UE can first allocate power for UL transmission on serving carrier/frequency and then limit the transmit power for discovery message transmission on other carrier/frequency to remaining power available after allocating power for UL transmission.

In another embodiment of the present disclosure, the D2D UE can prioritize between transmission in serving carrier/frequency and discovery message transmission on other carrier/frequency. In one embodiment of the present disclosure, transmission in serving carrier/frequency can be prioritized over discovery message transmission on carrier/frequency. In an alternate embodiment of the present disclosure, the discovery message transmission on other carrier/frequency is prioritized over transmission in serving carrier/frequency. In another alternate embodiment of the present disclosure, if the D2D UE supports both PS and non-PS discovery and transmission on serving carrier/frequency is because of non-PS discovery, then the D2D UE can prioritize transmission in other carrier/frequency.

In another embodiment of the present disclosure, the eNB can avoid scheduling concurrently based on indication from the D2D UE. The D2D UE can send discovery message transmission interest indication including carrier/frequency for discovery message transmission to eNB. In an embodiment of the present disclosure, the eNB can provide gaps (i.e. not schedule UL transmission) corresponding to discovery sub-frames on carrier/frequency for discovery message transmission. The eNB can be aware of where the gaps are needed if it knows discovery resource configuration in carrier/frequency for discovery message transmission. In another embodiment of the present disclosure, the information about discovery resource configuration or discovery sub-frames in carrier/frequency for discovery message transmission can be provided by the D2D UE.

In another embodiment of the present disclosure, the D2D UE can perform first and second embodiment in RRC idle state and third embodiment in RRC connected state.

According to another embodiment of the present disclosure, the present system and method can handle interference between DL reception in serving carrier and discovery transmission on the other carrier. Discovery transmission in other carrier/frequency can interfere with DL RX in serving cell on carrier/frequency if serving frequency and the other carrier/frequency are close.

According to an embodiment of the present disclosure, the D2D UE can perform the discovery transmission on other carrier/frequency only during DRX (i.e. when it is not performing DL Reception) if discovery transmission on the carrier/frequency interferes with DL reception in serving cell on carrier/frequency. In an embodiment of the present disclosure, the frequency(s) for which there is interference can be indicated by eNB. The indication can be there in SIB 19 in frequency list.

In another embodiment of the present disclosure, the D2D UE can perform the discovery transmission on non-serving cell only during DRX i.e. when it is not performing DL Reception.

In another embodiment of the present disclosure, the D2D UE can send the discovery transmission interest indication including carrier/frequency for discovery message transmission. In an embodiment of the present disclosure, the eNB can provide gaps (i.e. does not schedule DL) corresponding to discovery sub-frames on carrier/frequency. The eNB can provide gaps if discovery transmission on the other carrier/frequency interfere with DL RX on serving cell's frequency. The eNB can be aware of where the gaps are needed if it knows discovery resources configuration in non-serving cell's frequency. In another embodiment of the present disclosure, information about discovery resource configuration or discovery sub-frames in carrier/frequency for discovery message transmission can be provided by the D2D UE.

According to an embodiment of the present disclosure, the present system and method can use one or more triggers for transmitting discovery message transmission on other carrier while being camped on serving carrier.

According to the trigger 1, the D2D UE can be camped on a cell. The D2D UE determines if the serving cell's carrier/frequency is the frequency on which it has to transmit discovery message. If the serving cell's carrier/frequency is not the carrier/frequency on which it has to transmit discovery message, then the D2D UE triggers transmission of discovery message on other carrier/frequency. For example, a public safety (PS) UE performs public safety communication on certain carrier/frequency. So irrespective of whether the serving cell supports discovery message transmission or not, the PS UE triggers transmission in other carrier/frequency (on PS carrier/frequency) if serving cell's carrier/frequency is not the carrier/frequency on which PS communication is performed. In another embodiment of the present disclosure, this trigger for discovery message transmission is used by PS UE for transmission of PS discovery (e.g. group member discovery, relay discovery for PS communication) related messages.

According to the trigger 2, the D2D UE can be camped on a cell. If the SIB 19 is not broadcasted in serving cell, then the D2D UE triggers transmission of discovery message transmission on other carrier/frequency.

According to the trigger 3, the D2D UE can be camped on a cell. The SIB 19 can be broadcasted by the serving cell. If the D2D UE requests discovery resources from eNB and eNB does not assign resources for discovery message transmission, then the D2D UE triggers transmission of discovery message transmission on other carrier/frequency. The D2D UE requests discovery resources from the eNB if the D2D UE is in idle state and the SIB 19 does not include common resources (i.e. discTxPoolCommon) for discovery message transmission. Alternately the D2D UE requests discovery resources from the eNB if the D2D UE is in connected state.

According to the trigger 4, the D2D UE can be camped on a cell. If the SIB 19 is broadcasted without including discConfig (includes common resources for discovery message transmission and/or resources for discovery message reception), then the D2D UE triggers transmission of discovery message transmission on other carrier/frequency.

According to the present disclosure, the D2D UE triggers discovery message transmission on other carrier/frequency based on one or more of these triggers. The D2D UE operation for determining whether the D2D UE should transmit on radio frequency of serving cell or non-serving cell in various embodiments is shown in FIGS. 3a, 3b, 3c, 3d, 3e, 4a, and 4b.

Figure 3A:
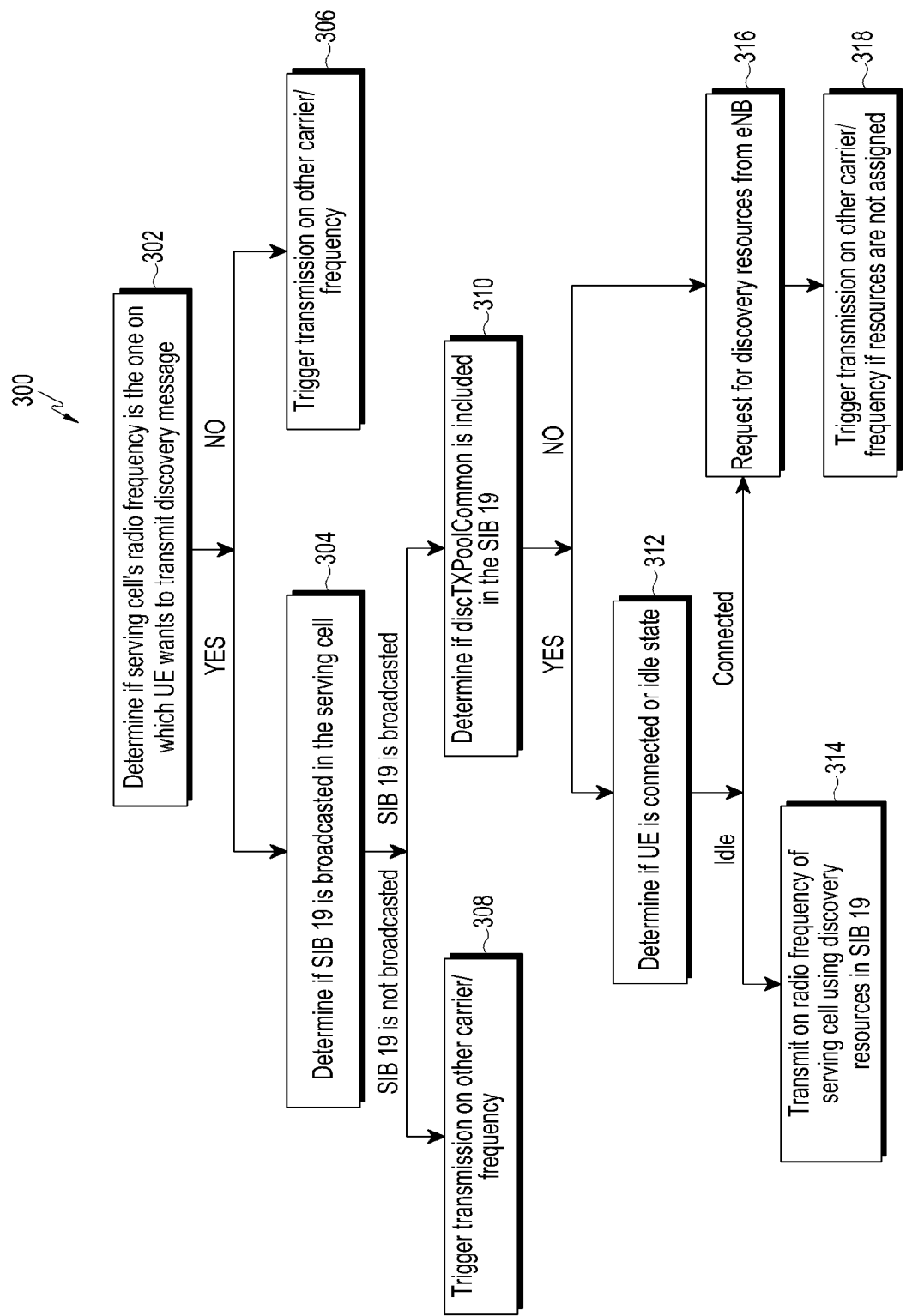
FIG. 3a is a schematic flow diagram illustrating a trigger for discovery message transmission on other carrier/frequency, according to an embodiment of the present disclosure.

FIG. 3a is a schematic flow diagram 300 illustrating a trigger for discovery message transmission on other carrier/frequency, according to an embodiment of the present disclosure. According to the flow diagram 300, at step 302, the UE determines if serving cell's radio frequency (RF) is the one on which the UE wants to transmit discovery message. If the UE identifies that the serving cell's RF is the one on which the UE wants to transmit the discovery message, then at step 304, the UE determines whether the SIB 19 is broadcasted in the serving cell. If no, then at step 306, the UE triggers transmission of the discovery message on the other carrier/frequency.

If the UE identifies that the SIB 19 is not broadcasted, then at step 308, the UE triggers transmission of the discovery message on the other carrier/frequency. If the UE identifies that the SIB 19 is broadcasted, then at step 310, the UE determines whether discTXPoolCommon is included in the SIB 19. If yes, then at step 312, the UE further determines whether the UE is in connected state or idle state. If the UE is in idle state, then at step 314, the UE transmits discovery message on radio frequency (RF) of serving cell using discovery resources in SIB 19. If the UE is connected state, then at step 316, the UE requests for resources from eNB. Further, at step 318, the UE triggers transmission of discovery message on other carrier/frequency if t the resources are not assigned. Further, if the UE determines that the discTXPoolCommon is not included in the SIB 19, then at step 316, the UE requests for resources from eNB. Further, at step 318, the UE triggers transmission of discovery message on other carrier/frequency if t the resources are not assigned.

Although FIG. 3*a* illustrates a trigger for discovery message transmission on other carrier/frequency, according to an embodiment of the present disclosure, various changes could be made to FIG. 3*a*. For example, although shown as a series of operations, various operations in FIG. 3*a* could overlap, occur in parallel, occur in a different order, or occur multiple times.

Figure 3B:
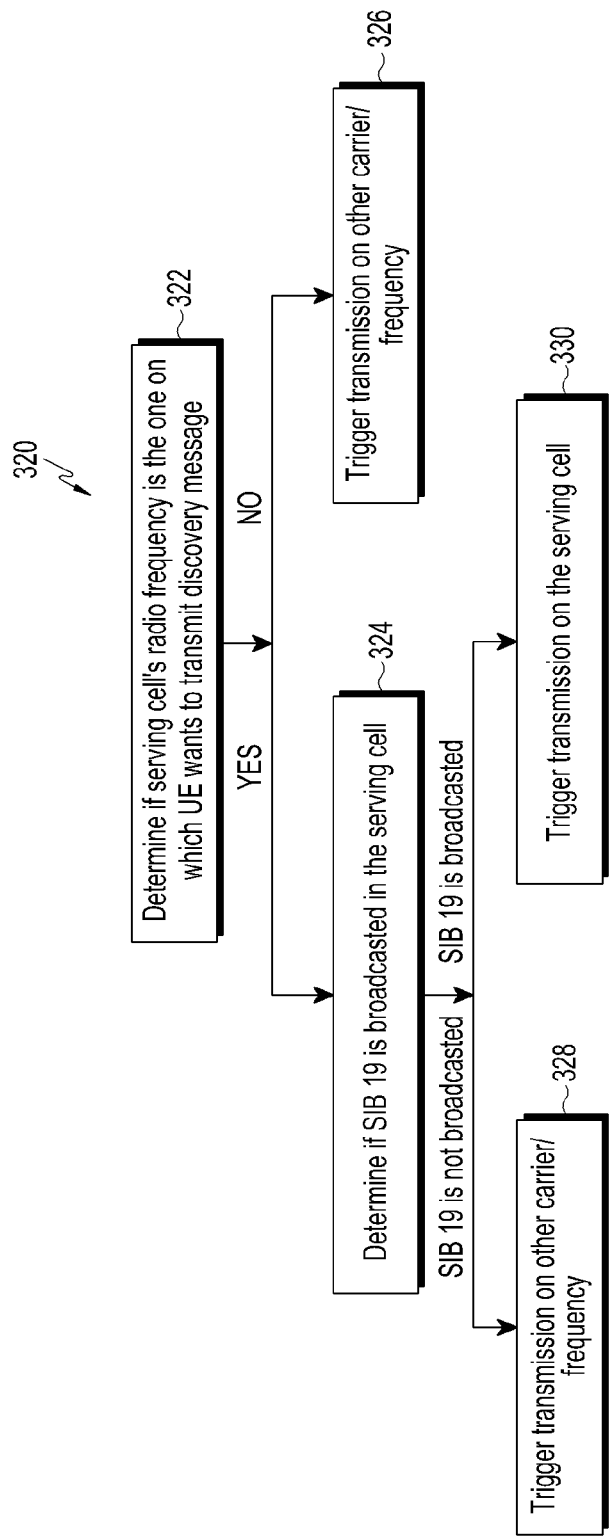
FIG. 3b is a schematic flow diagram illustrating a trigger for discovery message transmission on other carrier/frequency, according to another embodiment of the present disclosure.

FIG. 3*b* is a schematic flow diagram 320 illustrating a trigger for discovery message transmission on other carrier/frequency, according to another embodiment of the present disclosure. According to the flow diagram 320, at step 322, the UE determines if serving cell's RF is the one on which the UE wants to transmit discovery message. If yes, then at step 324, the UE determines whether the SIB 19 is broadcasted in the serving cell. If no, then at step 326, the UE triggers transmission of the discovery message on the other carrier/frequency.

If the UE determines that SIB 19 is not broadcasted, then at step 328, the UE triggers transmission of the discovery message on the other carrier/frequency. If the UE determines that the SIB 19 is broadcasted, then at step 330, the UE initiates transmission of the discovery message on the serving cell.

Although FIG. 3*b* illustrates a trigger for discovery message transmission on other carrier/frequency, according to another embodiment of the present disclosure, various changes could be made to FIG. 3*b*. For example, although shown as a series of operations, various operations in FIG. 3*b* could overlap, occur in parallel, occur in a different order, or occur multiple times.

Figure 3C:
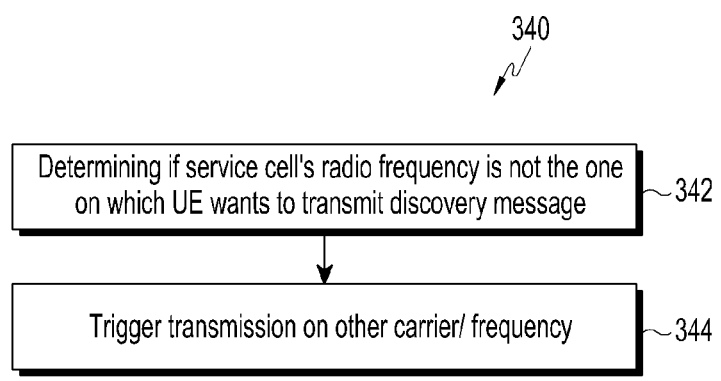
FIG. 3c is a schematic flow diagram illustrating a trigger for discovery message transmission on other carrier/frequency, according to another embodiment of the present disclosure.

FIG. 3*c* is a schematic flow diagram 340 illustrating a trigger for discovery message transmission on other carrier/frequency, according to another embodiment of the present disclosure. According to the flow diagram 340, at step 342, the UE determines whether serving cell's radio frequency (RF) is not the one on which the UE wants to transmit discovery message. If yes, then at step 344, the UE triggers transmission of the discovery message on the other carrier/frequency.

Figure 3D:
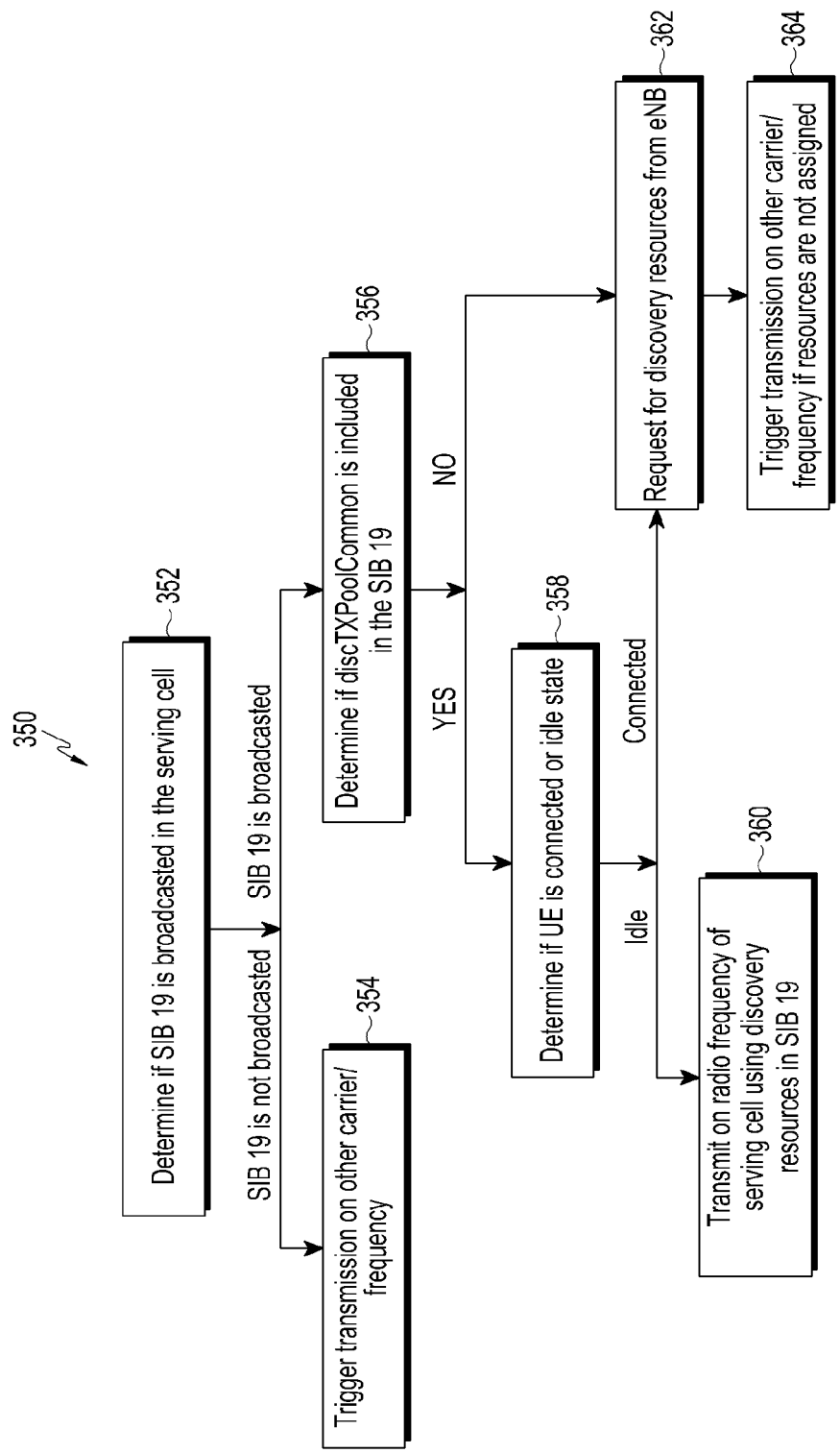
FIG. 3d is a schematic flow diagram illustrating a trigger for discovery message transmission on other carrier/frequency, according to another embodiment of the present disclosure.

FIG. 3*d* is a schematic flow diagram 350 illustrating a trigger for discovery message transmission on other carrier/frequency, according to another embodiment of the present disclosure. According to the flow diagram 350, at step 352, the UE determines if SIB 19 is broadcasted in the serving cell. If SIB 19 is not broadcasted in the serving cell, then at step 354, the UE triggers transmission of the discovery message on the other carrier/frequency. If the SIB 19 is broadcasted on the serving cell, then at step 356, the UE determines whether discTXPoolCommon is included in the SIB 19. If discTXPoolCommon is included in the SIB 19, then at step 358, the UE determines whether the UE is in connected state or idle state.

If the UE is in idle state, then at step 360, the UE transmits discovery message on radio frequency (RF) of serving cell using discovery resources in SIB 19. If the UE is connected state, then at step 362, the UE requests for resources from eNB. Further, at step 364, the UE triggers transmission of discovery message on other carrier/frequency if the resources are not assigned. Further, if the UE determines that the discTXPoolCommon is not included in the SIB 19, then at step 362, the UE requests for resources from eNB.

Further, at step 364, the UE triggers transmission of discovery message on other carrier/frequency if the resources are not assigned Although FIG. 3*d* illustrates a trigger for discovery message transmission on other carrier/frequency, according to another embodiment of the present disclosure, various changes could be made to FIG. 3*d*. For example, although shown as a series of operations, various operations in FIG. 3*d* could overlap, occur in parallel, occur in a different order, or occur multiple times.

Figure 3E:
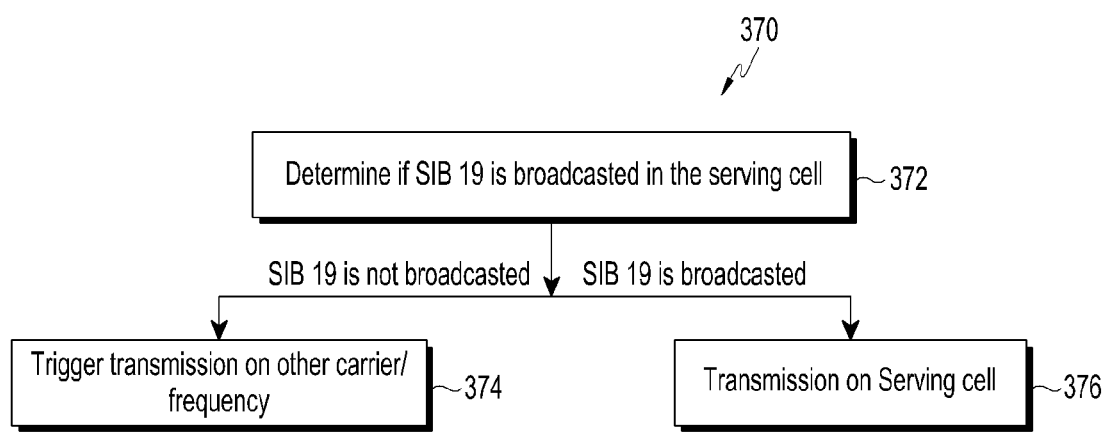
FIG. 3e is a schematic flow diagram illustrating a trigger for discovery message transmission on other carrier/frequency, according to another embodiment of the present disclosure.

FIG. 3*e* is a schematic flow diagram 370 illustrating a trigger for discovery message transmission on other carrier/frequency, according to another embodiment of the present disclosure. According to the flow diagram 370, at step 372, the UE determines if SIB 19 is broadcasted in the serving cell. If SIB 19 is not broadcasted in the serving cell, then at step 374, the UE triggers transmission of the discovery message on the other carrier/frequency. If the SIB 19 is broadcasted on the serving cell, then at step 356, the UE initiates discover message transmission on the serving cell.

Figure 4A:
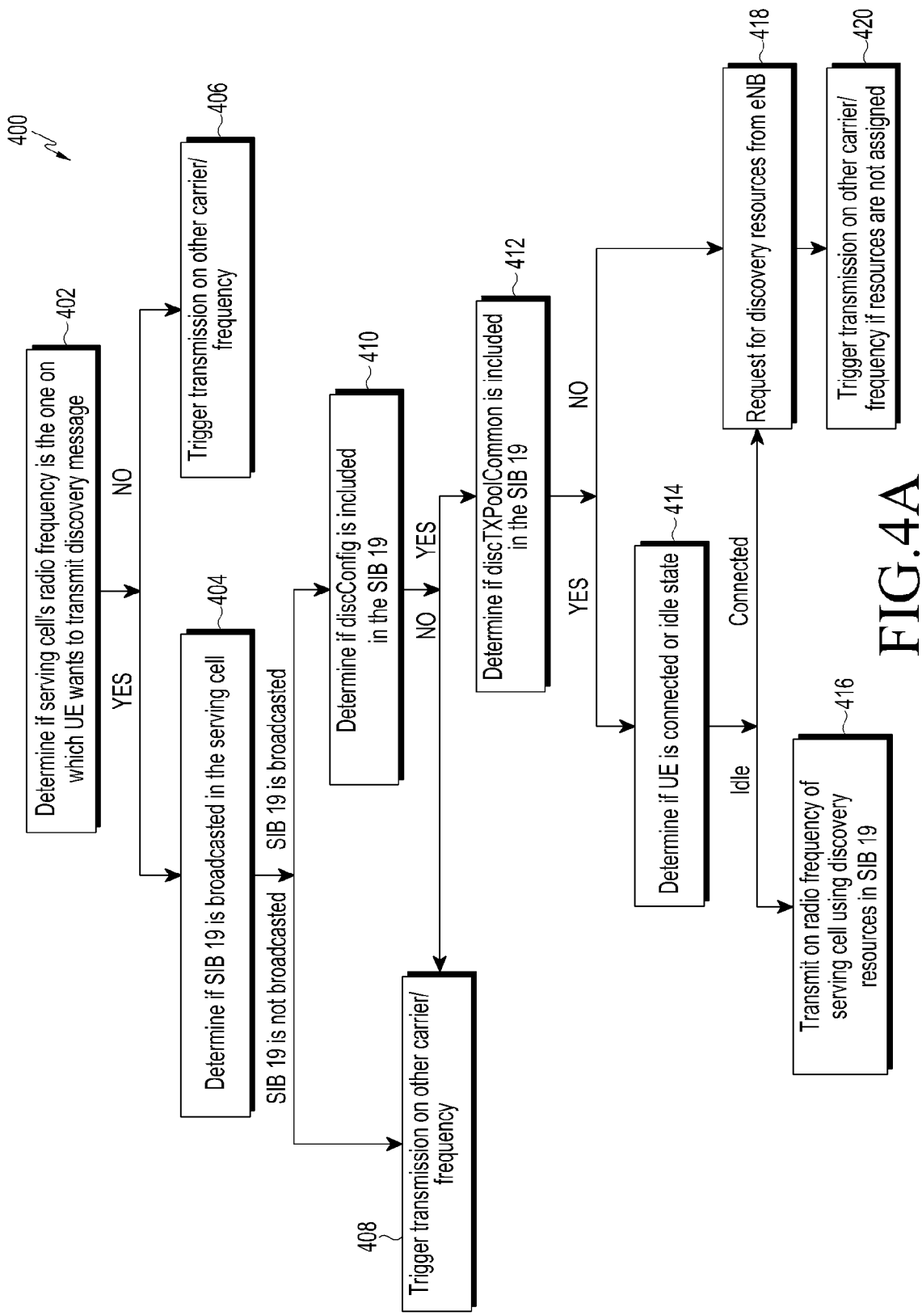
FIG. 4a is a schematic flow diagram illustrating a trigger for discovery message transmission on other carrier/frequency, according to yet another embodiment of the present disclosure.

FIG. 4*a* is a schematic flow diagram 400 illustrating a trigger for discovery message transmission on other carrier/frequency, according to yet another embodiment of the present disclosure. According to the flow diagram 400, at step 402, the UE determines if serving cell's radio frequency (RF) is the one on which the UE wants to transmit discovery message. If the UE identifies that the serving cell's RF is the one on which the UE wants to transmit the discovery message, then at step 404, the UE determines whether the SIB 19 is broadcasted in the serving cell. If no, then at step 406, the UE triggers transmission of the discovery message on the other carrier/frequency.

If the UE identifies that the SIB 19 is not broadcasted, then at step 408, the UE triggers transmission of the discovery message on the other carrier/frequency. If the UE identifies that the SIB 19 is broadcasted, then at step 410, the UE determines whether discConfig is included in the SIB 19. If no, then the UE proceeds to step 408, wherein the UE triggers transmission of the discovery message on the other carrier/frequency. If yes, then at step 412, the UE determines whether discTXPoolCommon is included in the SIB 19. If yes, then at step 414, the UE further determines whether the UE is in connected state or idle state. If the UE is in idle state, then at step 416, the UE transmits discovery message on radio frequency (RF) of serving cell using discovery resources in SIB 19. If the UE is connected state, then at step 418, the UE requests for resources from eNB. Further, at step 420, the UE triggers transmission of discovery message on other carrier/frequency if the resources are not assigned. Further, if the UE determines that the discTXPoolCommon is not included in the SIB 19, then at step 418, the UE requests for resources from eNB. Further, at step 420, the UE triggers transmission of discovery message on other carrier/frequency if the resources are not assigned.

Although FIG. 4*a* illustrates a trigger for discovery message transmission on other carrier/frequency, according to yet another embodiment of the present disclosure, various changes could be made to FIG. 4*a*. For example, although shown as a series of operations, various operations in FIG. 4*a* could overlap, occur in parallel, occur in a different order, or occur multiple times.

Figure 4B:
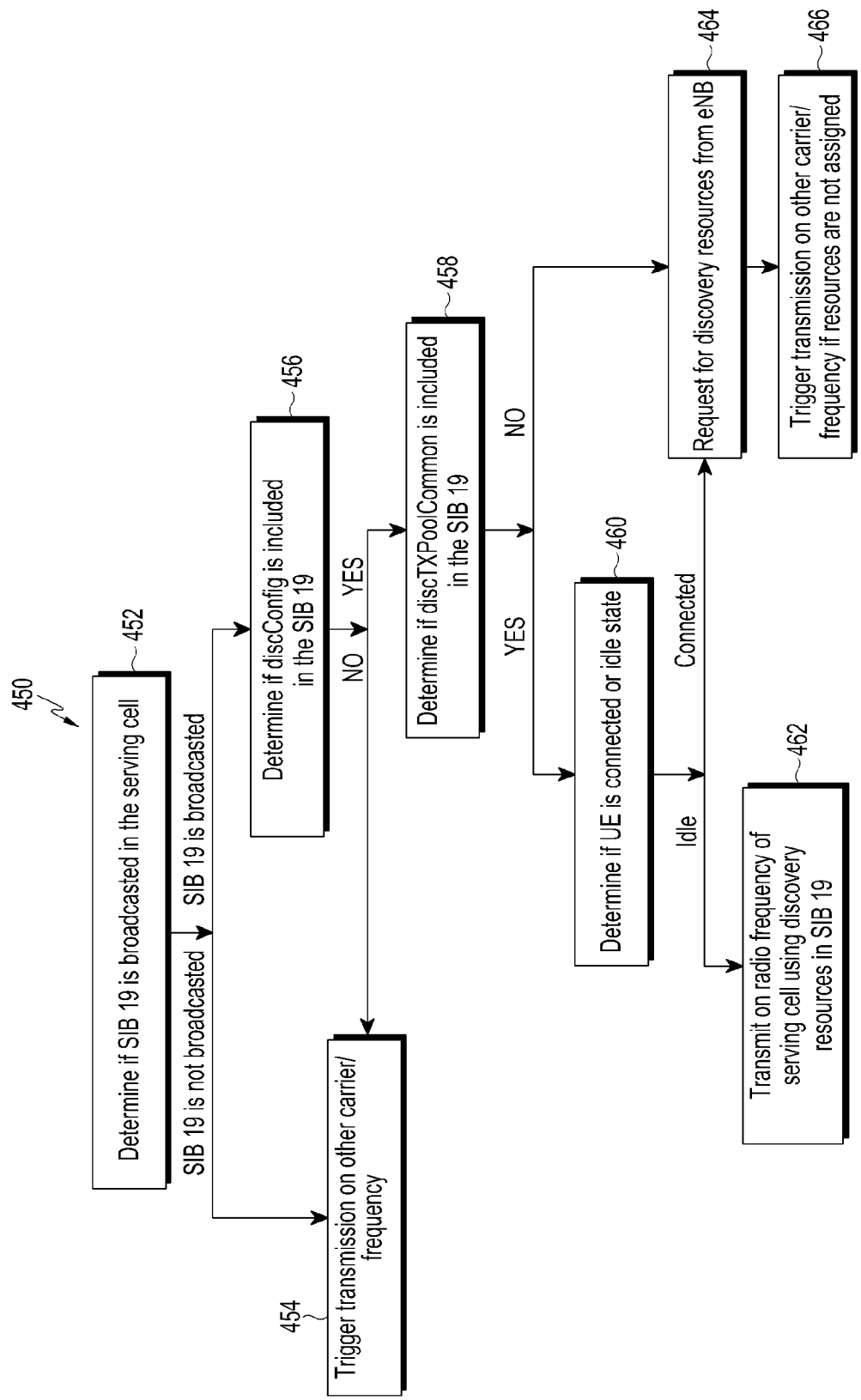
FIG. 4b is a schematic flow diagram illustrating a trigger for discovery message transmission on other carrier/frequency, according to yet another embodiment of the present disclosure.

FIG. 4*b* is a schematic flow diagram 450 illustrating a trigger for discovery message transmission on other carrier/frequency, according to yet another embodiment of the present disclosure. According to the flow diagram 450, at step 452 the UE determines if SIB 19 is broadcasted in the serving cell. If SIB 19 is not broadcasted in the serving cell, then at step 454, the UE triggers transmission of the discovery message on the other carrier/frequency. If the SIB 19 is broadcasted on the serving cell, then at step 456, the UE determines whether discConfig is included in the SIB 19. If no, then the UE proceeds to step 454, wherein the UE triggers transmission of the discovery message on the other carrier/frequency. If yes, then at step 458, the UE determines whether discTXPoolCommon is included in the SIB 19. If discTXPoolCommon is included in the SIB 19, then at step 460, the UE determines whether the UE is in connected state or idle state.

If the UE is in idle state, then at step 462, the UE transmits discovery message on radio frequency (RF) of serving cell using discovery resources in SIB 19. If the UE is connected state, then at step 464, the UE requests for resources from eNB. Further, at step 466, the UE triggers transmission of discovery message on other carrier/frequency if the resources are not assigned. Further, if the UE determines that the discTXPoolCommon is not included in the SIB 19, then at step 464, the UE requests for resources from eNB. Further, at step 466, the UE triggers transmission of discovery message on other carrier/frequency if t the resources are not assigned.

According to an embodiment of the present disclosure, the present system and method can handle collision between discovery resources and communication resources. According to the present disclosure, resources for D2D discovery and D2D communication are separately signaled or configured by the network. Sometimes, it is possible that discovery resources and D2D communication resources collide (same resource is indicated in both discovery and communication resources) with each other. The collisions can be handled as follows:

According to an embodiment of the present disclosure, during the discovery resource selection for discovery transmission in a discovery period, the D2D UE excludes those discovery sub-frames which are overlapping in time domain with D2D communication resources, wherein the communication resources can be one of the following:

Resources which UE has selected for transmitting D2D communication packets,
Resources which has been assigned to UE for transmitting the D2D communication packets, and
All the communication resources configured by network for transmitting the D2D communication packets.

According to another embodiment of the present disclosure, the D2D UE can drop the transmission of D2D communication packet in a sub-frame which is overlapping with discovery transmission if communication packet does not carry any urgent data (e.g. data related to emergency service).

Although FIG. 4b illustrates a trigger for discovery message transmission on other carrier/frequency, according to yet another embodiment of the present disclosure, various changes could be made to FIG. 4b. For example, although shown as a series of operations, various operations in FIG. 4b could overlap, occur in parallel, occur in a different order, or occur multiple times.

Figure 5:
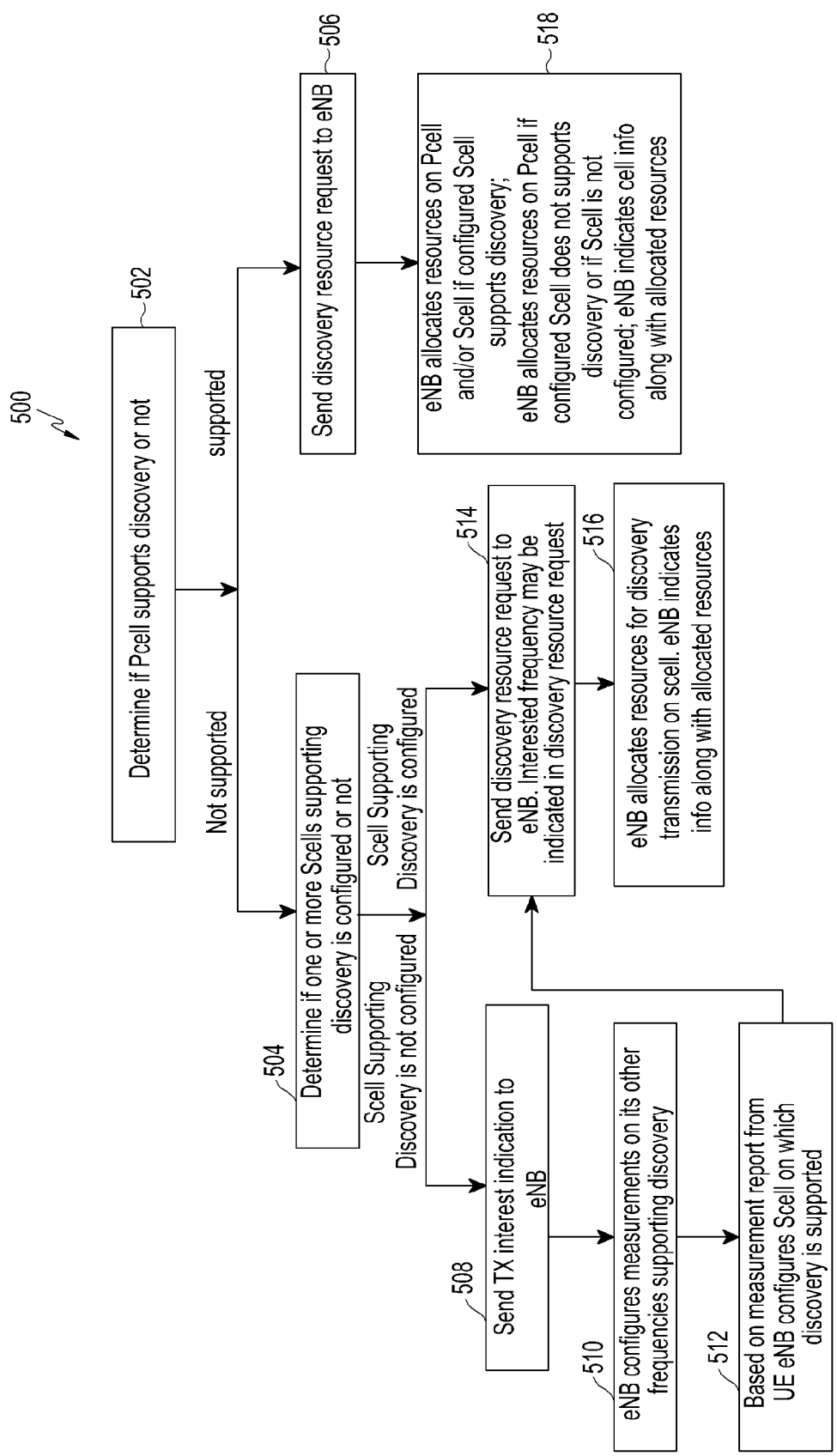
FIG. 5 is a schematic flow diagram illustrating discovery message transmission on secondary cell, according to an embodiment of the present disclosure.

FIG. 5 is a schematic flow diagram 500 illustrating discovery message transmission on secondary cell, according to an embodiment of the present disclosure. According to the flow diagram 500, at step 502, the UE is camped on a cell (i.e. serving cell). The UE interested in discovery message transmission first determines if the Pcell supports D2D discovery or not. The UE can be configured with multiple serving cells, one of which is designated as Pcell and rest are designated as Scell. The UE can be configured with only one cell and in this case this cell is the Pcell.

According to an embodiment of the present disclosure, the Pcell does not support discovery if the SIB 19 is not transmitted by the Pcell or if the SIB 19 is transmitted but transmit resources and receive resources corresponding to the Pcell are not included in the SIB 19 or if the SIB 19 is transmitted but transmit resources corresponding to the Pcell are not included in the SIB 19 or if the SIB 19 is transmitted but receive resources corresponding to the Pcell are not included in SIB 19. Alternately, one or more frequencies on which discovery transmission is supported is indicated by the Pcell and if serving frequency (corresponding to Pcell) is not included in this list then the Pcell does not support discovery.

If the Pcell does not support discovery then, at step 504, the UE determines if one or more Scells supporting discovery is configured or not. Scell does not support discovery if the SIB 19 is not transmitted by the Scell or if the SIB 19 is transmitted but transmit resources and receive resources corresponding to the Scell are not included in the SIB 19 or if the SIB 19 is transmitted but transmit resources corresponding to the Scell are not included in the SIB 19 or if the SIB 19 is transmitted but receive resources corresponding to the Scell are not included in the SIB 19. Alternately, one or more frequencies on which discovery transmission is supported is indicated by the Scell in the SIB19 and if frequency (corresponding to the Scell) is not included in this list then the Scell does not support discovery. Alternately, whether Scell supports discovery or not may indicated by the Pcell by broadcast signaling or dedicated signaling (in RRC connection reconfiguration when Scell is configured or in response to discovery TX interest indication).

If the Scell supporting discovery is not configured then, at step 508, the UE sends TX interest indication to eNB. Further, at step 510, the eNB configures measurements on one or more frequencies on which discovery is supported. Further, at step 512, based on measurement reports from the UE, the eNB configures the Scell on which discovery is supported. In one embodiment, Scell corresponds to same eNB as Pcell. In an embodiment of the present disclosure, the Scell may correspond to secondary eNB (SeNB). In another embodiment of the present disclosure, if the Scell supporting discovery is not configured then, at step 514, the UE sends discovery resource request to eNB instead of TX interest indication. In alternate embodiment, based on measurement reports from UE, at step 516, the eNB performs inter frequency mobility to cell of carrier on which discovery is supported instead of adding Scell to allocate resources for discovery transmission on the Scell, wherein the eNB indicates the Scell information (Scell index or frequency information) along with the allocated resources.

In another embodiment of the present disclosure, if the Scell supporting discovery is configured, then according to step 514, the UE sends discovery resource request to eNB, wherein the UE can indicate interested frequency in discovery resource request. Based on the request received from the UE, at step 516, the eNB allocates resources for discovery transmission on Scell. eNB indicates Scell info (Scell index i.e. actual Cell ID or index in RRC connection reconfiguration used to configure Scell and/or frequency info) along with allocated resources.

According to another embodiment of the present disclosure, if the Scell supporting discovery is configured then the UE reads the SIB 19 transmitted in Scell and uses the TX resources indicated in SIB19 for discovery message transmission. If more than one Scell supports discovery transmission, then the UE can choose any one Scell or choose the Scell with better RSRP/RSRQ or choose the Scell which has less discovery load. The discovery load in the Scell can be indicated by the Scell (e.g. in SIB19) or the Pcell in broadcast or dedicated signaling. According another embodiment of the present disclosure, if the Scell supporting discovery is configured, then at step 514, the UE sends discovery resource request to eNB. UE may indicate interested frequency in discovery resource request. If the eNB does not allocate resources and if Scell supporting discovery is configured, then the UE reads the SIB 19 transmitted in Scell and uses the TX resources indicated in SIB19 for discovery message transmission.

Further, if the Pcell supporting discovery is not configured then, at step 508, the UE sends TX interest indication to eNB. At step 510, the eNB configures measurements on one or more frequencies on which discovery is supported. Based on measurement reports from UE, at step 512, the eNB performs inter frequency mobility to cell of carrier on which discovery is supported.

If the Pcell does support discovery then, at step 506, the UE sends discovery resource request to eNB. At step 518, the eNB allocates resources on Pcell and/or Scell if configured Scell supports discovery; the eNB allocates resources on Pcell if configured Scell does not supports discovery or if Scell is not configured; eNB indicates cell info (cell index i.e. actual Cell ID or index in RRC connection reconfiguration used to configure cell and/or frequency info) along with allocated resources. In one embodiment if eNB does not allocate resources on Pcell or Scell, then if Scell supporting discovery is configured then UE reads the SIB 19 transmitted in Scell and uses the TX resources indicated in SIB19 for discovery message transmission.

Although FIG. 5 illustrates discovery message transmission on secondary cell, according to an embodiment of the present disclosure, various changes could be made to FIG. 5. For example, although shown as a series of operations, various operations in FIG. 5 could overlap, occur in parallel, occur in a different order, or occur multiple times.

Figure 6:
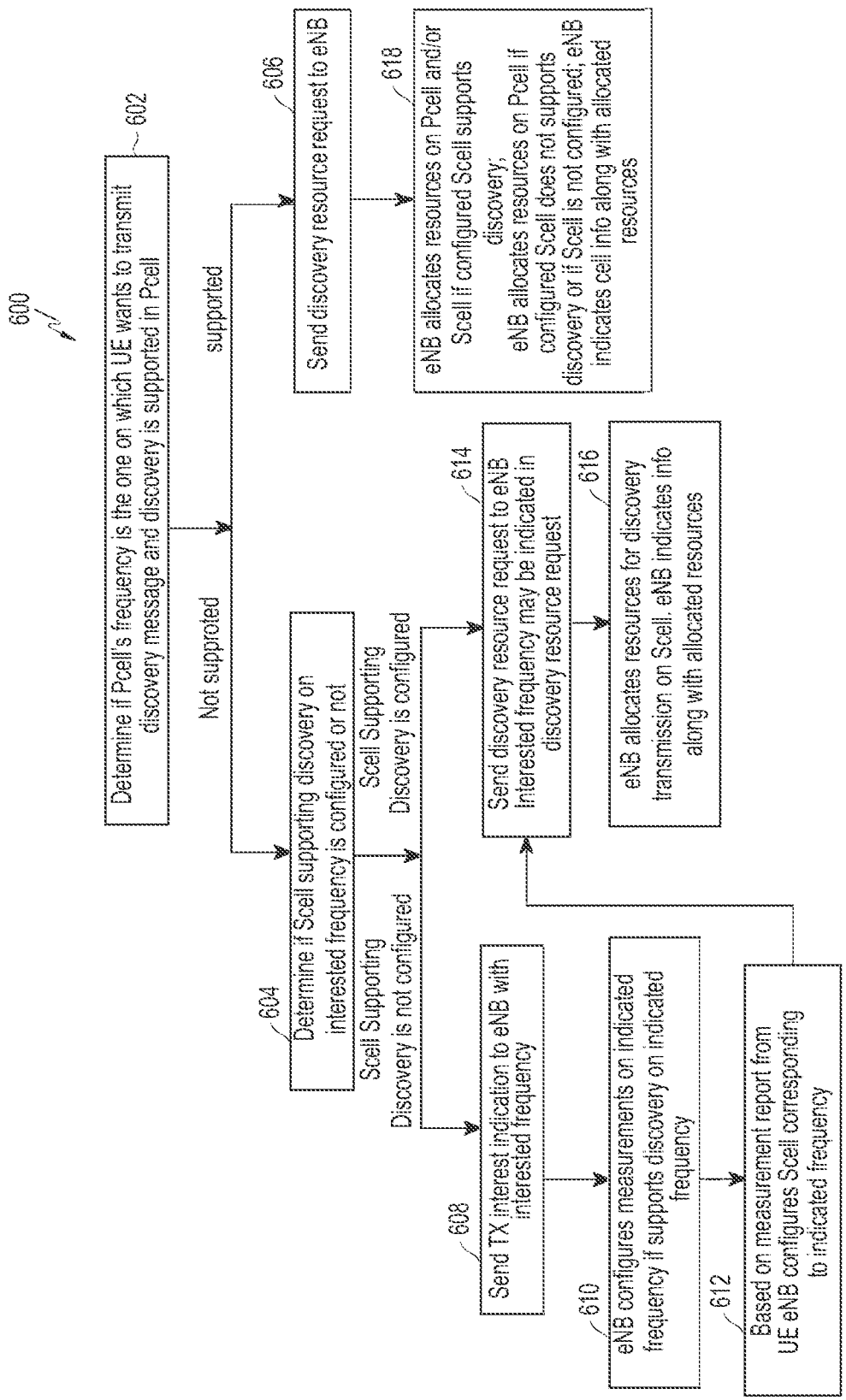
FIG. 6 is a schematic flow diagram illustrating operation for discovery message transmission in secondary cell, according to an alternate embodiment of the present disclosure.

FIG. 6 is a schematic flow diagram 600 illustrating operation for discovery message transmission in secondary cell, according to an alternate embodiment of the present disclosure. According to the flow diagram 600, at step 602, the UE is camped on a cell (i.e. serving cell). The UE interested in discovery message transmission first determines if the Pcell's frequency is the one on which UE wants to transmit discovery message and if Pcell supports D2D discovery or not. The UE can be configured with multiple serving cells, one of which is designated as Pcell and rest are designated as Scell. UE may be configured with only one cell and in this case this cell is the Pcell.

According to the present disclosure, the one or more frequencies on which the UE wants to transmit discovery message is either preconfigured or configured by ProSe server or configured based on the UE capability. Further, the Pcell does not support discovery if SIB 19 is not transmitted by the Pcell or if SIB 19 is transmitted but transmit resources and receive resources corresponding to Pcell are not included in SIB 19 or if SIB 19 is transmitted but transmit resources corresponding to Pcell are not included in SIB 19 or if SIB 19 is transmitted but receive resources on the serving frequency are not included in SIB 19. Alternately, one or more frequencies on which discovery is supported is indicated by Pcell and if serving frequency (corresponding to Pcell) is not included in this list then Pcell does not support discovery.

If the Pcell does not support discovery or if the Pcell's frequency is not the frequency on which the UE wants to transmit discovery message then, at step 604, the UE determines whether one or more Scells on its frequency of interest supporting discovery is configured or not. According to an embodiment of the present disclosure, the Scell does not support discovery if SIB 19 is not transmitted by the Scell or if SIB 19 is transmitted but transmit resources and receive resources corresponding to Scell are not included in SIB 19 or if SIB 19 is transmitted but transmit resources corresponding to Scell are not included in SIB 19 or if SIB 19 is transmitted but receive resources corresponding to Scell are not included in SIB 19. Alternately, one or more frequencies on which discovery is supported is indicated by Scell and if frequency (corresponding to Scell) is not included in this list then Scell does not support discovery. Alternately, whether Scell supports discovery or not may indicated in Pcell by broadcast signaling or dedicated signaling.

If the Scell on its frequency of interest supporting discovery is not configured then, at step 608, the UE sends TX interest indication to eNB, wherein the UE indicates interested frequency in TX interest indication. Based on the received indication along with the interested frequency, at step 610, the eNB configures measurements on indicated frequency on which discovery is supported. At step 612, based on measurement reports from UE, eNB configures Scell on which discovery is supported. In one embodiment, Scell corresponds to same eNB as Pcell. In an alternate embodiment Scell may correspond to slave eNB (SeNB), without departing from the scope of the disclosure. In an alternate embodiment if Scell supporting discovery on its frequency of interest is not configured, then at step 614, the UE sends discovery resource request to eNB instead of TX interest indication. In alternate embodiment, at step 616, based on measurement reports from UE, eNB perform inter frequency mobility to cell of carrier on which discovery is supported instead of adding Scell, wherein the eNB allocates resources for discovery transmission on Scell. ENB indicates Scell info (Scell index i.e. actual Cell ID or index in RRC connection reconfiguration used to configure Scell and/or frequency info) along with allocated resources.

If the Scell supporting discovery is configured then, at step 614, the UE sends discovery resource request to eNB. The UE indicate interested frequency in discovery resource request. Based on the received request along with interested frequency indicated, at step 616, the eNB allocates resources for discovery transmission on Scell. The eNB indicates the Scell info (Scell index i.e. actual Cell ID or index in RRC connection reconfiguration used to configure Scell and/or frequency info) along with allocated resources. In another embodiment, if Scell supporting discovery is configured then UE reads the SIB 19 transmitted in Scell and uses the TX resources indicated in SIB19 for discovery message transmission. If more than one Scell supports discovery transmission then UE can choose any one Scell or choose a Scell with better RSRP/RSRQ or choose a Scell which has less discovery load. The discovery load in Scell may be indicated by Scell (e.g. in SIB19) or Pcell in broadcast or dedicated signaling. In another embodiment of the present disclosure, if Scell supporting discovery is configured, then UE sends discovery resource request to the eNB. The UE indicate interested frequency in discovery resource request. If the eNB does not allocate resources and if Scell supporting discovery is configured, then the UE reads the SIB 19 transmitted in the Scell and uses the TX resources indicated in SIB19 for discovery message transmission.

If the Pcell does not support discovery or if the Pcell's frequency is not the frequency on which the UE wants to transmit discovery message then, at step 608, the UE sends TX interest indication to the eNB, wherein the UE includes the frequency of interest in the indication. The eNB configures measurements on indicated frequency. Based on measurement reports from the UE, the eNB performs inter frequency mobility to cell of carrier on which discovery is supported.

If the Pcell does support discovery and if the Pcell's frequency is the frequency on which the UE wants to transmit discovery message then, at step 606, the UE sends discovery resource request to eNB. Based on the received request, at step 618, the eNB allocates resources on Pcell and/or Scell if configured Scell supports discovery and configured Scell frequency is the frequency on which UE can transmit discovery message; the eNB allocates resources on Pcell if configured Scell does not supports discovery or if Scell is not configured or if Scell frequency is not the frequency on which UE wants to transmit discovery message; eNB indicates cell info (cell index i.e. actual Cell ID or index in RRC connection reconfiguration used to configure cell and/or frequency info) along with allocated resources. In one embodiment of the present disclosure, if the eNB does not allocate resources on Pcell or Scell, then if Scell on interested frequency supporting discovery is configured, then the UE reads the SIB 19 transmitted in Scell and uses the TX resources indicated in SIB19 for discovery message transmission.

Although FIG. 6 illustrates operation for discovery message transmission in secondary cell, according to an alternate embodiment of the present disclosure, various changes could be made to FIG. 6. For example, although shown as a series of operations, various operations in FIG. 6 could overlap, occur in parallel, occur in a different order, or occur multiple times.

Figure 7:
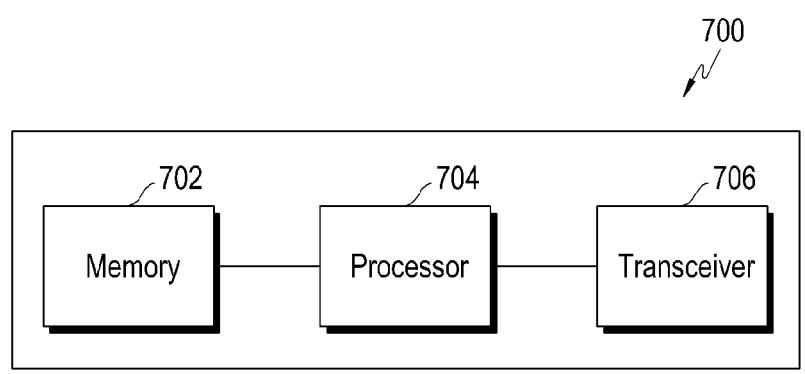
FIG. 7 is a schematic diagram illustrating a wireless communication device 700 of a D2D wireless communication system, according to an embodiment of the present disclosure.

FIG. 7 is a schematic diagram illustrating a wireless communication device 700 of a D2D wireless communication system, according to an embodiment of the present disclosure. According to the FIG. 7, the wireless communication device 700 comprises of a memory 702, a processor 704, and a transceiver 706. The memory 702 store instructions, which are executable by the processor 704 such that the wireless communication device 700 is operable to perform any of the D2D discovery processes described herein above with respect to FIGS. 1-6. The processor 704 identifies one or more carriers for transmission of one or more D2D discovery messages from a network. Further, the processor 704 determines one or more discovery resources for transmission of one or more D2D discovery messages on the one or more identified carriers. The transceiver 706 is adapted to transmit the one or more D2D discovery messages on the one or more identified carriers.

The memory 702, the processor 704, and the transceiver 706 are described as separate processors, it is to be understood that this is merely for convenience of description. In other words, two or more of memory 702, the processor 704, and the transceiver 706 may be incorporated into a single processor.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
    camping on a first cell on a first carrier frequency;
    obtaining system information including configuration information while camping on the first cell, wherein the system information is broadcasted by a second cell;
    identifying whether the obtained configuration information includes a discovery resource information for discovery message transmission on a second carrier frequency;

transmitting, to the first cell, a resource request message for discovery message transmission including information indicating a number of at least one discovery message for which the terminal requests and information indicating the second carrier frequency; and in case that the obtained configuration information includes a discovery resource information for discovery message transmission on the second carrier frequency, transmitting a discovery message on the second carrier frequency based on the discovery resource information for discovery message transmission, wherein in case that the obtained configuration information does not include a discovery resource information for discovery message transmission on the second carrier frequency, the discovery message on the second carrier frequency is not transmitted.

2. The method of claim 1, further comprising:

selecting at least one resource randomly selected from resource pools indicated by the discovery resource information for each discovery period.

3. The method of claim 1, wherein the configuration information includes resource pool configuration associated with at least two carrier frequencies for transmitting the discovery message; and wherein the at least two carrier frequencies belong to different public land mobile networks (PLMNs).

4. The method of claim 1, wherein the system information includes a list of carrier frequency information including one or more frequencies on which the terminal is allowed to transmit the discovery message with a corresponding PLMN identifier.

5. The method of claim 1, wherein the system information comprises a carrier frequency, a PLMN identifier (ID) and cell information associated with a resource for the discovery message transmission.

6. The method of claim 1, further comprising:

identifying a discovery message transmission does not occur on the first cell with an uplink transmission of the terminal;

identifying the discovery message transmission overlaps in time with the uplink transmission of the terminal; and adjusting power for the discovery message transmission such that total transmission power of the terminal does not exceed a maximum power of the terminal during a time when the discovery message transmission and the uplink transmission of the terminal overlaps.

7. The method of claim 1, further comprising:

receiving, from the first cell, information indicating gaps for the discovery message transmission;

identifying a timing of the first cell for the discovery message transmission; and transmitting the discovery message on the second carrier frequency based on the identified timing.

8. The method of claim 1, further comprising:

triggering the discovery message transmission on a predetermined carrier frequency different from a carrier frequency of the first cell of the terminal, if the terminal identifies that the system information is not broadcasted by the first cell.

9. The method of claim 1, further comprising:

transmitting, to the first cell, first information indicating sub-frames on which gaps are needed; and based on the sub-frames indicated in the first information, receiving, from the first cell, second information indicating gaps for the discovery message transmission, where an uplink transmission is not scheduled, the second information comprising information for sub-frames during which the discovery message is prioritized by the terminal to be transmitted by the terminal over the uplink transmission.

10. A terminal in a wireless communication system, the terminal comprising:

a transceiver; and at least one processor configured to:

camp on a first cell on a first carrier frequency, obtain system information including configuration information while camping on the first cell, wherein the system information is broadcasted by a second cell, identify whether the obtained configuration information includes a discovery resource information for discovery message transmission on a second carrier frequency, transmit, to the first cell, a resource request message for discovery message transmission including information indicating a number of at least one discovery message for which the terminal requests and information indicating the second carrier frequency, and in case that the obtained configuration information includes a discovery resource information for discovery message transmission on the second carrier frequency, transmit a discovery message on the second carrier frequency based on the discovery resource information for discovery message transmission, wherein in case that the obtained configuration information does not include a discovery resource information for discovery message transmission on the second carrier frequency, the discovery message on the second carrier frequency is not transmitted.

11. The terminal of claim 10, wherein the at least one processor is further configured to:

select at least one resource randomly selected from resource pools indicated by the discovery resource information for each discovery period.

12. The terminal of claim 10, wherein the configuration information includes resource pool configuration associated with at least two carrier frequencies for transmitting the discovery message; and wherein the at least two carrier frequencies belong to different public land mobile networks (PLMNs).

13. The terminal of claim 10, wherein the system information includes a list of carrier frequency information including one or more frequencies on which the terminal is allowed to transmit the discovery message with a corresponding PLMN identifier.

14. The terminal of claim 10, wherein the system information comprises a carrier frequency, a PLMN identifier (ID) and cell information associated with a resource for the discovery message transmission.

15. The terminal of claim 10, wherein the at least one processor is further configured to:

identify a discovery message transmission does not occur on a first cell with an uplink transmission of the terminal;

identify the discovery message transmission overlaps in time with the uplink transmission of the terminal; and adjust power for the discovery message transmission such that total transmission power of the terminal does not exceed a maximum power of the terminal during a time when the discovery message transmission and the uplink transmission of the terminal overlaps.

16. The terminal of claim 10, wherein the at least one processor is further configured to:
- receive, from the first cell, information indicating gaps for the discovery message transmission;
- identify a timing of the first cell for the discovery message transmission; and
- transmit the discovery message on the second carrier frequency based on the identified timing.

17. The terminal of claim 10, wherein the at least one processor is further configured to:
- trigger the discovery message transmission on a predetermined carrier frequency different from a carrier frequency of the first cell of the terminal, if the terminal identifies that the system information is not broadcasted by the first cell.

18. The terminal of claim 10, wherein the at least one processor is further configured to:
- transmit, to the first cell, first information indicating sub-frames on which gaps are needed; and
- based on the sub-frames indicated in the first information, receive, from the first cell, second information indicating gaps for the discovery message transmission, where an uplink transmission is not scheduled, the second information comprising information for sub-frames during which the discovery message is prioritized by the terminal to be transmitted by the terminal over the uplink transmission.

\* \* \* \* \*